US012743971B2

(12) United States Patent
Lamberts et al.

(10) Patent No.: US 12,743,971 B2

(45) Date of Patent: Sep. 22, 2026

(54) FRAMING SYSTEM FOR FABRIC SIGNS

(71) Applicants: Jason Lamberts, Grand Rapids, MI (US); Steven J. Bursach, Grand Rapids, MI (US)

(72) Inventors: Jason Lamberts, Grand Rapids, MI (US); Steven J. Bursach, Grand Rapids, MI (US)

(73) Assignee: Signcomp, LLC, Grand Rapids, MI (US)

( * ) Notice: Subject to any disclaimer, the term of this patent is extended or adjusted under 35 U.S.C. 154(b) by 71 days.

(21) Appl. No.: 18/632,225

(22) Filed: Apr. 10, 2024

(65) Prior Publication Data

US 2024/0257669 A1 Aug. 1, 2024

Related U.S. Application Data

(63) Continuation-in-part of application No. PCT/IB2022/059699, filed on Oct. 10, 2022.

(60) Provisional application No. 63/254,163, filed on Oct. 10, 2021.

(51) Int. Cl.

*G09F 7/18* (2006.01)

*G09F 15/00* (2006.01)

(52) U.S. Cl.

CPC ............ *G09F 7/18* (2013.01); *G09F 15/0025* (2013.01); *G09F 2007/1843* (2013.01); *G09F 2007/1886* (2013.01); *G09F 2015/0093* (2013.01)

(58) Field of Classification Search

CPC ......... G09F 15/0025; G09F 2015/0093; G09F 2007/1886

USPC ........................................................... 40/603

See application file for complete search history.

(56) References Cited

U.S. PATENT DOCUMENTS

| | | | |
|---|---|---|---|
| 2,335,361 | A | 11/1943 | Schiller |
| 3,058,279 | A | 10/1962 | Metcalfe |
| 4,041,861 | A | 8/1977 | Alter |
| 4,265,039 | A | 5/1981 | Brooks |
| 4,317,302 | A | 3/1982 | Von De Linde |
| 4,452,000 | A | 6/1984 | Gandy |

(Continued)

OTHER PUBLICATIONS

International Search Report and Written Opinion of the International Searching Authority from corresponding Patent Cooperation Treaty (PCT) Application No. PCT/IB2022/059699, mailed on Jan. 9, 2023.

*Primary Examiner* — Kyle R Grabowski

(74) *Attorney, Agent, or Firm* — Gardner, Linn, Burkhart & Ondersma LLP

(57) ABSTRACT

A framing system for fabric signs includes a tension clip and a mandrel, which may both be used in either of two opposite orientations for securing a fabric panel to a channel frame. The tension clip has at least one leg extending away from a frame-engaging portion, the leg defining at least a portion of a longitudinal fabric-receiving channel. The frame-engaging portion has a tooth for engaging a surface of a frame channel. The mandrel is insertable into the fabric-receiving channel with an edge portion of the fabric sign wrapped around the mandrel. The mandrel has an outboard rib at each end and a pair of medial ribs inboard of the outboard ribs, so that the mandrel defines outboard recesses and a medial recess along at least one of the mandrel's sides. The recesses receive respective fabric-engaging projections that extend into the fabric-receiving channel from the leg.

23 Claims, 15 Drawing Sheets

(56) References Cited

U.S. PATENT DOCUMENTS

| | | | | | |
|---|---|---|---|---|---|
| 4,516,343 | A | | 5/1985 | Stilling | |
| 4,542,605 | A | | 9/1985 | Gandy | |
| 4,547,987 | A | | 10/1985 | Stilling | |
| 4,674,214 | A | | 6/1987 | Gandy | |
| 4,692,847 | A | | 9/1987 | Gandy | |
| 4,937,961 | A | * | 7/1990 | Gandy | G09F 15/0025 40/574 |
| 4,955,928 | A | | 9/1990 | Tanner | |
| 5,033,216 | A | * | 7/1991 | Gandy | G09F 15/0025 40/574 |
| 5,046,546 | A | | 9/1991 | Benedyk et al. | |
| 5,255,459 | A | | 10/1993 | Verret | |
| 5,398,388 | A | * | 3/1995 | Coleman | G09F 15/0025 24/593.11 |
| 5,467,546 | A | * | 11/1995 | Kovalak, Jr. | G09F 15/0025 160/378 |
| 5,669,166 | A | * | 9/1997 | Verret | G09F 15/0025 40/604 |
| 6,061,941 | A | | 5/2000 | Verret | |
| 6,269,569 | B1 | * | 8/2001 | Doone | G09F 15/0012 40/603 |
| 2006/0242805 | A1 | * | 11/2006 | Coleman | G09F 15/0025 24/462 |
| 2012/0061539 | A1 | * | 3/2012 | Vanham | F16B 5/0692 248/224.8 |

* cited by examiner

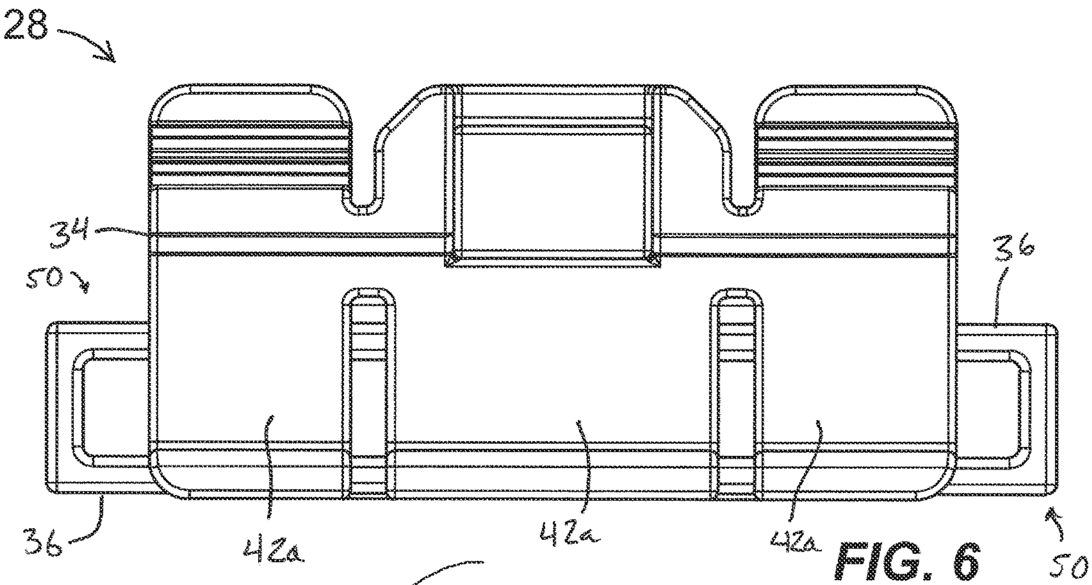
FIG. 6
FIG. 7
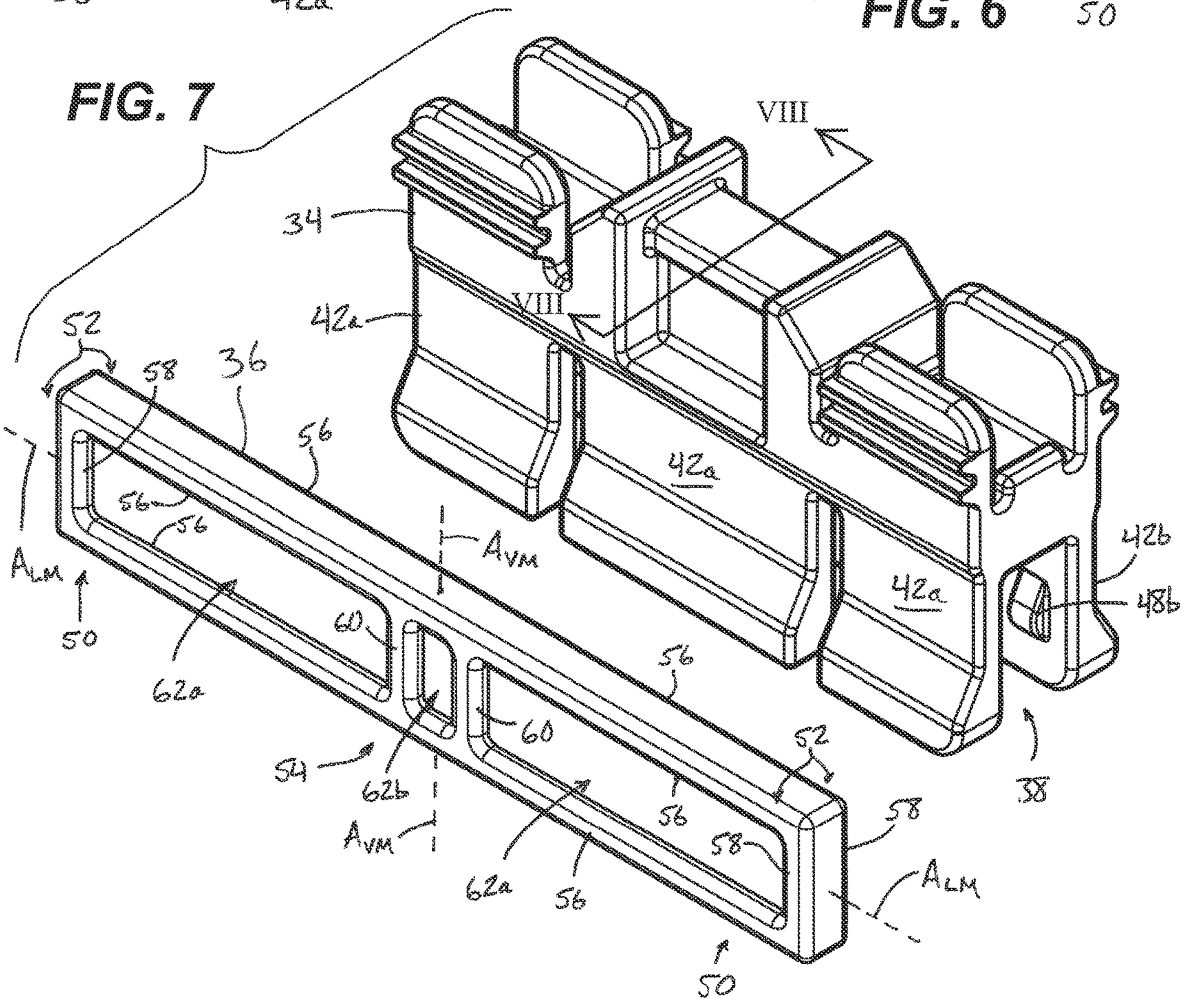

FRAMING SYSTEM FOR FABRIC SIGNS

CROSS REFERENCE TO RELATED APPLICATIONS

The present application is a continuation-in-part of International Patent Application Serial No. PCT/IB2022/059699 filed Oct. 10, 2022, which claims the priority benefit of U.S. provisional application Ser. No. 63/254,163 filed Oct. 10, 2021, which are hereby incorporated herein by reference in their entireties.

FIELD OF THE INVENTION

The present invention relates generally to signs, and more particularly, an apparatus for tensioning a fabric sign on a frame.

BACKGROUND OF THE INVENTION

Signs can be constructed from a fabric sheet that is tensioned or otherwise stretched over a frame. The frame may include or define features that enable it to securely receive a coupling device. The coupling device is used to couple the fabric sheet to the frame. Inadvertent decoupling of the fabric sheet from the frame sometimes occurs, particularly while the coupling device is vertically oriented and/or exposed to external forces such as vibrations. Additionally, due to specific and necessary installation requirements, coupling devices can improperly installed.

SUMMARY OF THE INVENTION

The present invention provides a framing system for fabric signs that can be used quickly and easily secure and tension a fabric sheet relative to a sign frame. A tension clip includes a retaining element that is located within a recess. The tension clip can be secured to the sign frame via a frame engaging portion. A mandrel, after being wrapped in a fabric sheet that is being used as a sign face, may be inserted into the recess where the retaining elements secure both the mandrel and the fabric sheet. The mandrel includes end ribs that may engage with the retaining element to prevent inadvertent release of the mandrel from the recess while the framing system is vertically-oriented. The tension clip may be securely adjusted relative to the sign frame after the mandrel and the fabric sheet have been secured within the recess in order to tension the fabric sheet.

According to one form of the invention, a framing system for fabric signs includes a tension clip and a mandrel. The tension clip has a frame-engaging portion and a leg extending away from the frame-engaging portion, the leg defining a portion of a fabric-receiving channel that extends longitudinally along the tension clip. The frame-engaging portion has a tooth for engaging a tooth-receiving surface of a frame channel. A pair of fabric-engaging projections extend inwardly into the fabric-receiving channel. The mandrel is insertable into the fabric-receiving channel with a fabric edge portion wrapped around the mandrel, the mandrel having opposite sides and opposite end portions. The mandrel has an outboard rib at each of the opposite end portions and a pair of spaced-apart medial ribs that are spaced inboard of the outboard ribs. This way, the mandrel defines an outboard recess between each of the outboard ribs and a respective one of the medial ribs, and the mandrel further defines a medial recess between the medial ribs. The fabric-engaging projections align with respective ones of the outboard recesses of the mandrel, and are configured to urge respective portions of the fabric edge portion into the outboard recesses. Tension in the fabric urges the tooth of the frame-engaging portion into engagement with the tooth-receiving surface of the frame channel, and urges the leg toward another surface of the frame channel opposite the tooth-receiving surface.

Optionally, both the tension clip and the mandrel have duplicative and longitudinally symmetrical features that enable each component to be cut in half while still maintaining their ability to secure and tension a fabric sheet relative to a sign frame. This allows a fabric sheet to be secured and tensioned relative to a sign frame having small radii or otherwise unique or challenging geometric configurations. Furthermore, the symmetrical nature of the various components of the framing system reduce the likelihood of errors during the sign installation process due improperly-oriented insertion or placement of one or more components.

According to another form of the invention, a framing system includes a tension clip and a mandrel. The tension clip defines a recess and includes a retaining element and a frame engaging portion. The mandrel defines a lateral depression between a pair of end ribs that are located at opposing ends of the mandrel. The framing system can be adjusted into a securing position in which the mandrel and a flexible panel are secured within the recess of the tension clip. This is accomplished by inserting the mandrel into the recess such that the retaining element engages with the depression. While in the securing position, the end ribs prevent inadvertent decoupling of the mandrel from the tension clip. The frame engaging portion selectively couples the tension clip to a sign frame.

In one aspect, the mandrel further defines a second lateral depression that is separated from the first lateral depression via a medial rib.

In another aspect, the mandrel defines a medial depression that is located between the lateral depressions.

In yet another aspect, the retaining element includes projections that are located on opposing side walls that partially define the recess.

In still another aspect, the tension clip is longitudinally symmetrical.

In a further aspect, the mandrel is longitudinally symmetrical.

In yet a further aspect, the mandrel has anterior and posterior sides that each include identical and symmetrical features relative to one another.

According to yet another form of the invention, a framing system for fabric signs includes a tension clip and a mandrel. The tension clip has a two-sided frame-engaging portion and a pair of legs extending away from the frame-engaging portion. The legs define a fabric-receiving channel that extends longitudinally along the tension clip. The two-sided frame-engaging portion includes a first tooth on a first side and a second tooth on a second side opposite the first side. The teeth are arranged such that the first tooth can engage a tooth-receiving surface of a frame channel when the tension clip is in a first orientation, and the second tooth can engage the tooth-receiving surface when the tension clip is in a second orientation rotated 180 degrees from the first orientation. A fabric-engaging projection extends inwardly into the fabric-receiving channel along each of the legs. The mandrel is insertable into the fabric-receiving channel with a fabric edge portion wrapped around the mandrel, the mandrel having opposite sides and opposite end portions. The mandrel includes an outboard rib at each of the opposite end portions along each of the opposite sides. The mandrel defines a recess along each of the opposite sides between the outboard ribs. The fabric-engaging projections align with respective recesses and urge respective portions of the fabric edge portion into the recess. Tension in the fabric urges one of the teeth of the frame-engaging portion into engagement with the tooth-receiving surface of the frame channel, and urges one of the legs toward another surface of the frame channel opposite the tooth-receiving surface.

According to another form of the invention, a framing system for fabric signs includes a tension clip and a mandrel. The tension clip defines a longitudinal recess and includes a retaining element and a frame engaging portion. The mandrel defines a first end rib at a first end of the mandrel and a second end rib at a second end of the mandrel. A first lateral depression is defined between the first and second end ribs. The framing system can be adjusted into a securing configuration in which the mandrel is at least partially disposed within the longitudinal recess and the retaining element is engaged with the first lateral depression to couple the mandrel to the tension clip. The first and second end ribs are configured to substantially terminate longitudinal movement of the mandrel while the framing system is in the securing configuration. The framing system secures a flexible panel within the recess while the framing system is in the securing configuration. The frame engaging portion is configured to selectively couple the tension clip to the frame.

Thus, the framing system of the present invention enables one installing a sign to quickly and easily secure and tension a fabric sheet relative to a sign frame. A tension clip includes a retention mechanism located within a recess. A mandrel wrapped in the fabric sheet can be inserted into the recess such that both the mandrel and fabric sheet are secured within the recess. The tension clip may then be coupled to a sign frame at a desired position to both couple the fabric sheet to the sign frame and adjust the tension of the fabric sheet.

These and other objects, advantages, purposes and features of the present invention will become apparent upon review of the following specification in conjunction with the drawings.

BRIEF DESCRIPTION OF THE DRAWINGS

FIG. 6 is a front elevation view of the tension clip and mandrel of FIG. 3;

FIG. 7 is an exploded perspective view of the tension clip and mandrel of FIG. 3;

DETAILED DESCRIPTION OF THE PREFERRED EMBODIMENTS

Figure 1:
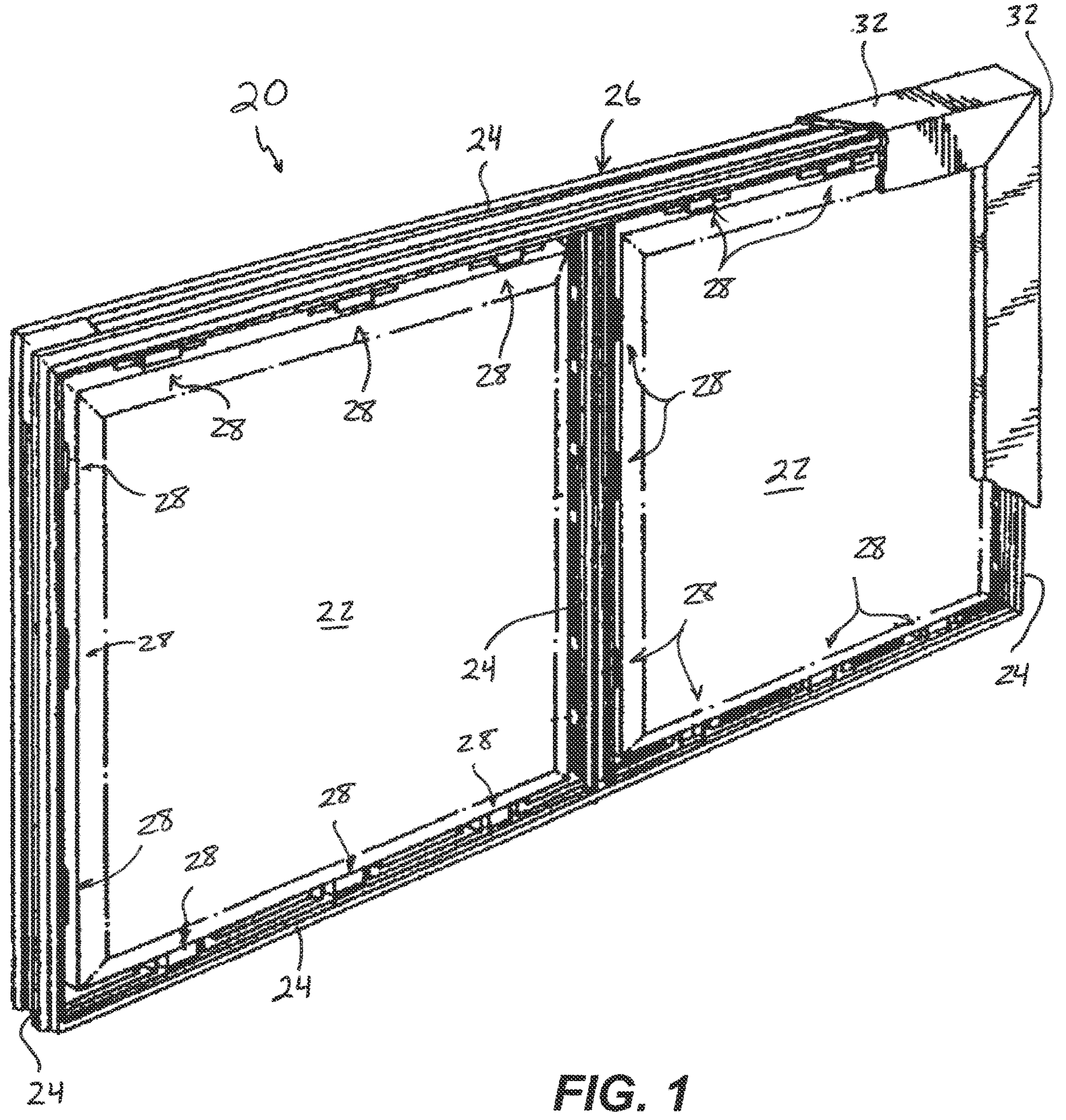
FIG. 1 is a perspective view of a fabric sign, that is tensioned using a framing system in accordance with the present invention, with aesthetic covers broken away to reveal structure.
Figure 2:
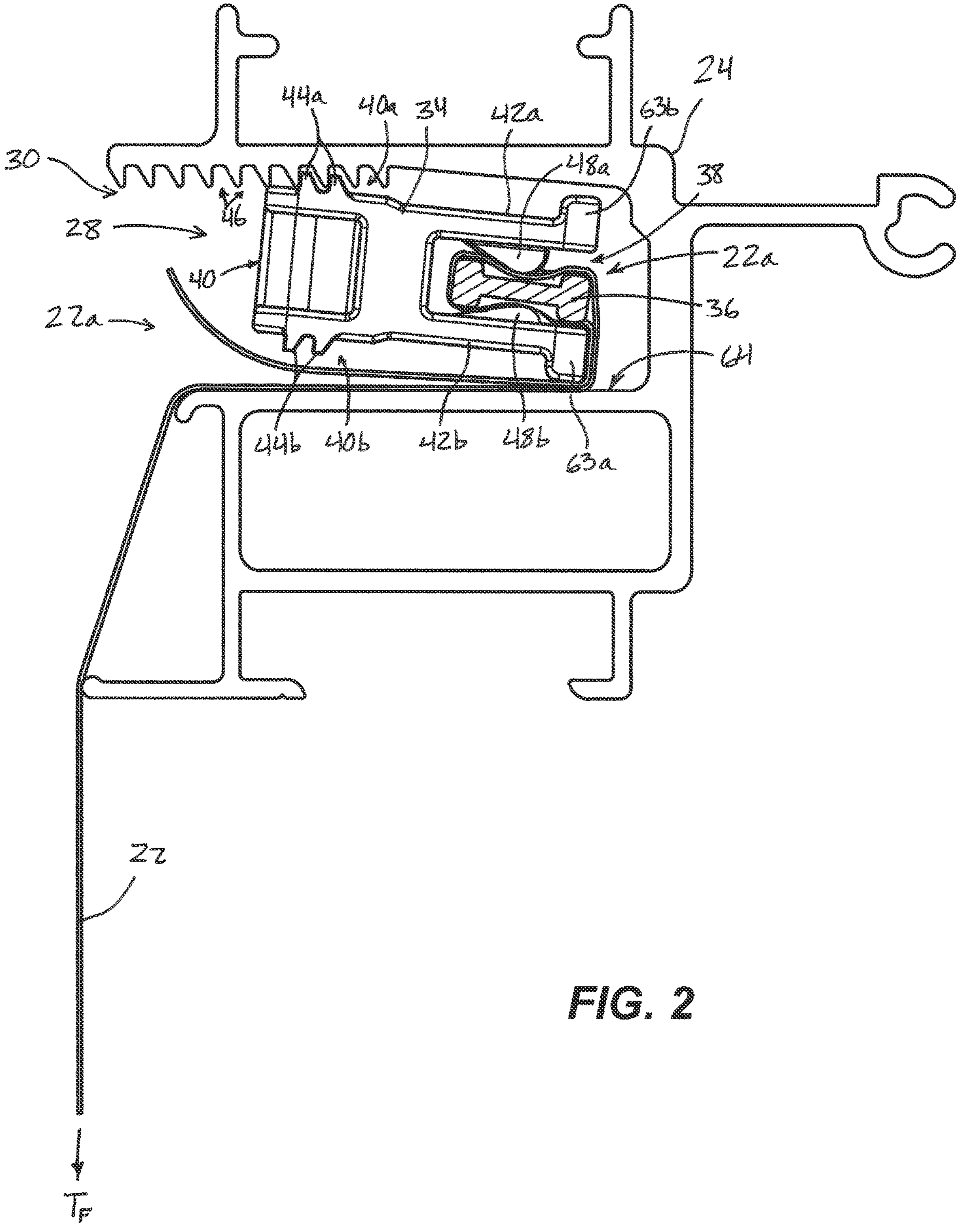
FIG. 2 is an enlarged end elevation view of a portion of a tension clip and mandrel of the framing system, shown secured to a sign frame and coupling a fabric sheet to the sign frame, and with a mandrel shown in section view to reveal hidden structure.

Referring now to the drawings and the illustrative embodiments depicted therein, a fabric sign assembly 20 includes one or more fabric sheets 22 held taut between frame pieces 24 that cooperate to form a sign frame 26, such as shown in FIG. 1. A plurality of tensioning assemblies 28 are engaged with a perimeter edge portion **22*a* of each fabric sheet 22, and are secured in channels 30 defined by frame pieces 24 (FIGS. 1 and 2). Tensioning assemblies 28 grip the perimeter edge portion 22*a* of fabric sheet 22 as tensioning assemblies 28 are inserted further into channels 30, causing fabric sheet 22 to be tightened. Once fabric sheet 22 is satisfactorily taut and free of wrinkles, aesthetic frame covers 32 may be installed over sign frame 26 to obscure tensioning assemblies 28 and frame pieces 24 from view, such as show at upper-right in FIG. 1. Frame pieces 24 and tensioning assemblies 28 cooperate to form a sign framing system that facilitates installation of fabric sign panels 22 for indoor or outdoor displays. As will be described in more detail below, tensioning assemblies 28 are equivalently usable in either of two orientations, which reduces assembly time and reduces the likelihood of assembly errors because there is no incorrect orientation for the tensioning assemblies 28** or their component parts.

Figure 9:
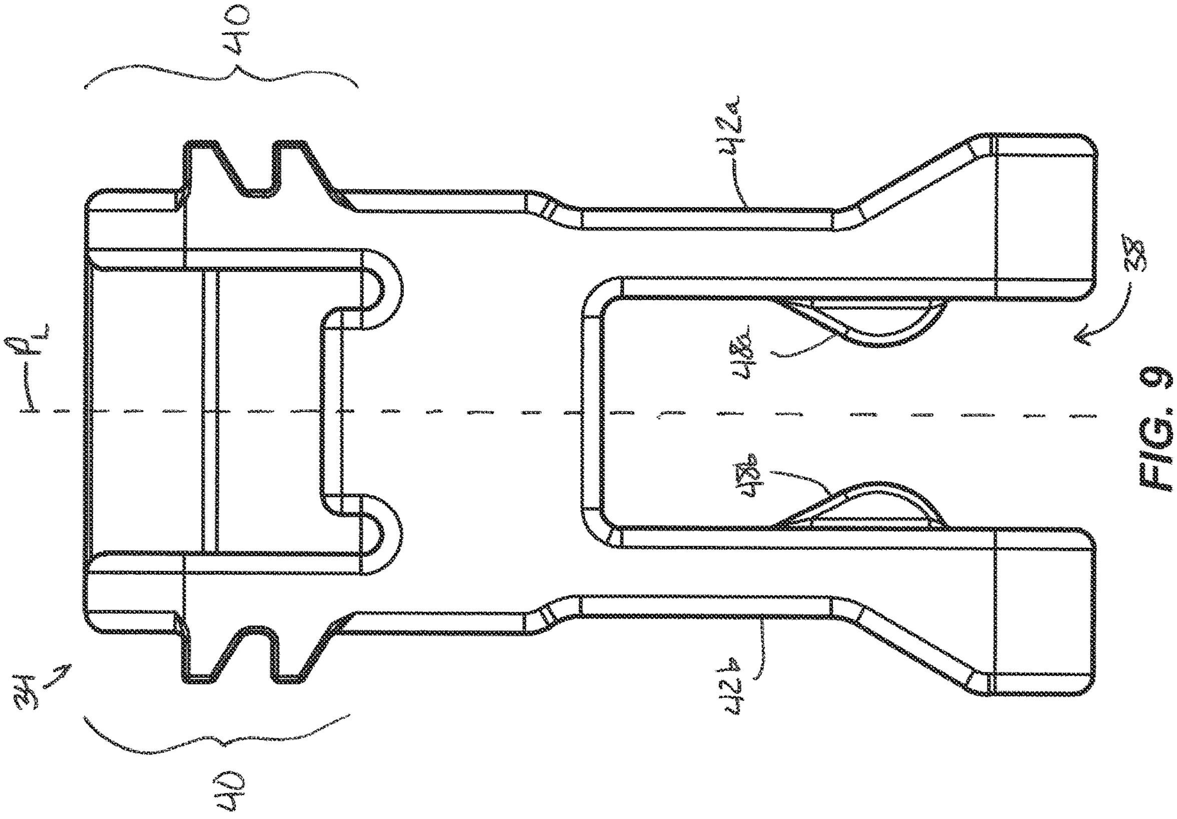
FIG. 9 is an end elevation view of the tension clip.
Figure 8:
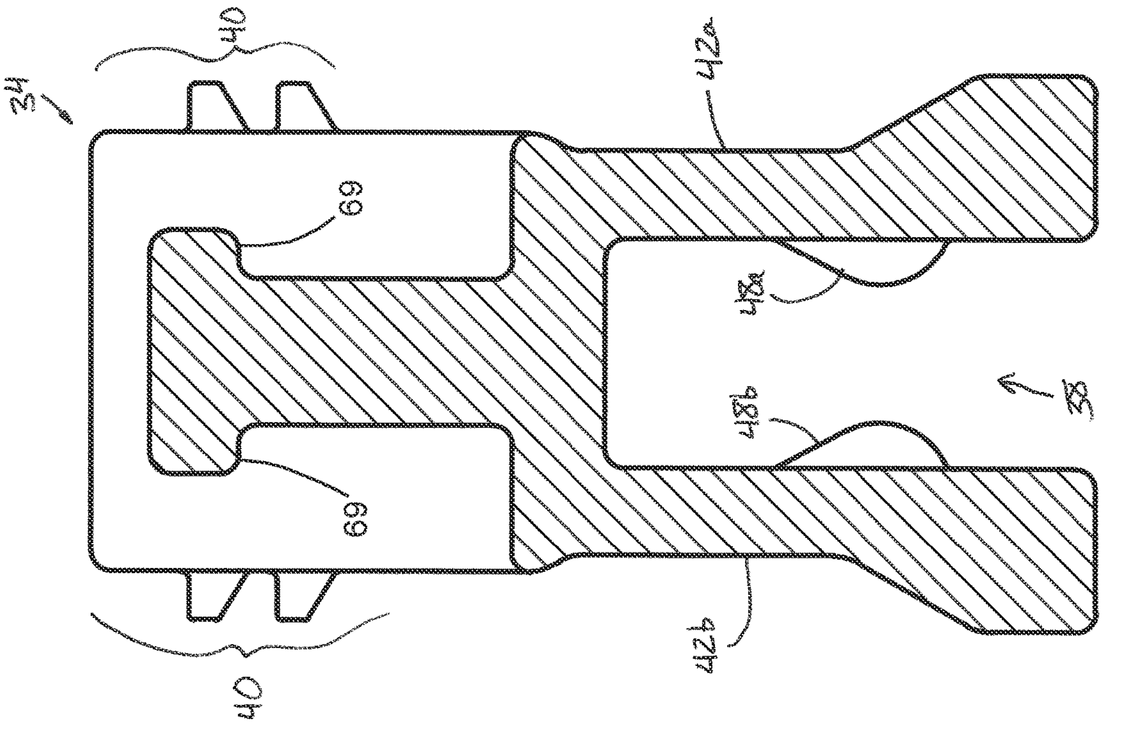
FIG. 8 is a cross-sectional side view of the tension clip, taken along line VIII-VIII of FIG. 7.

Each tensioning assembly 28 includes a tension clip 34 and a mandrel 36 for insertion into a fabric-receiving channel 38 of the tension clip 34 (FIGS. 2-6). The tension clip 34 includes a two-sided frame-engaging portion 40 and a pair of legs 42*a*, 42*b* extending away from the frame-engaging portion 40, the legs 42*a*, 42*b* defining the fabric-receiving channel 38, which extends longitudinally along the tension clip 34. Frame-engaging portion 40 is symmetrical about a longitudinal plane $P_L$ that extends centrally through tension clip 34 (FIG. 9). Frame-engaging portion 40 including a pair of first teeth 44*a* on a first side 40*a* and a pair of second teeth on a second side 40*b* opposite the first side 40*a*. Depending on the orientation of tension clip 34 in the frame channel 30, a tooth-receiving surface 46 along one side of the frame channel 30 will be engaged by one or both of the first teeth 44*a*, or by one or both of the second teeth 44*b*, as the tension clip 34 is inserted into the frame channel 30 in the manner of FIGS. 1 and 2. It will be appreciated that when tension clip 34 and mandrel 36 are rotated by 180 degrees about a vertical clip axis $A_{VC}$ (FIG. 3), the tension clip 34 and mandrel 36 would have the same appearance as shown in FIG. 2, except that the second teeth 44*b* would be engaging tooth-receiving surface 46 and the legs 42*a*, 42*b* would be reversed. Therefore, the tension clip 34 and mandrel 36 can be used in the same manner regardless of their orientation about vertical axis $A_V$.

Figure 10:
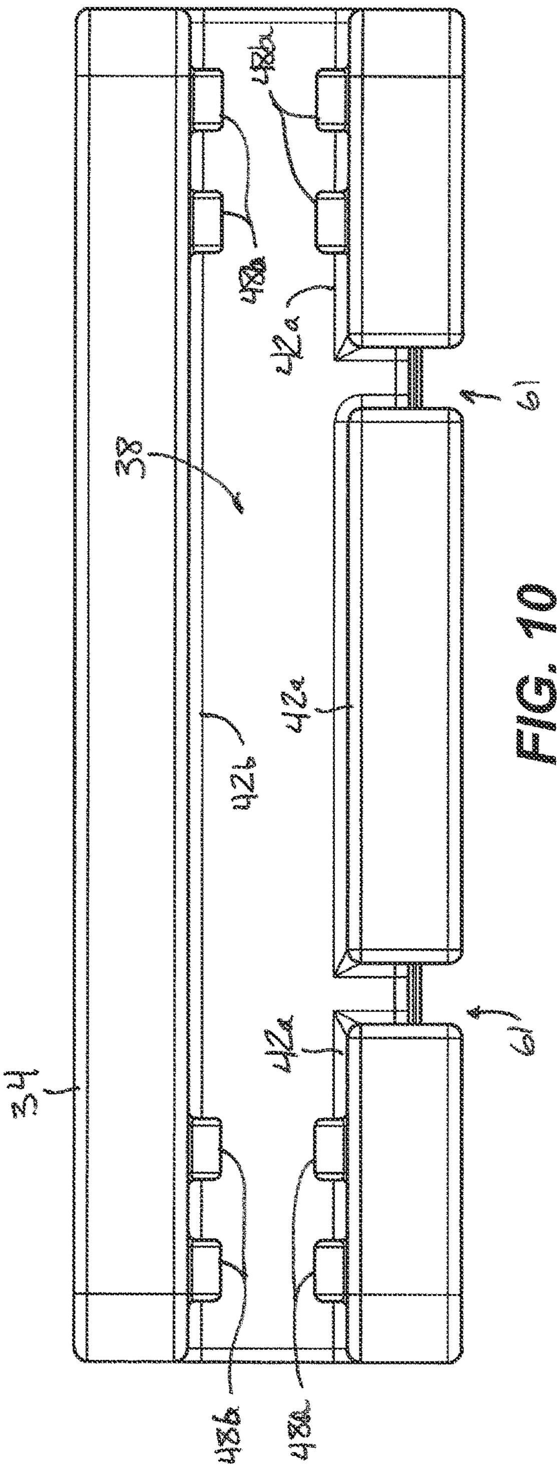
FIG. 10 is a bottom plan view of the tension clip.
Figure 11:
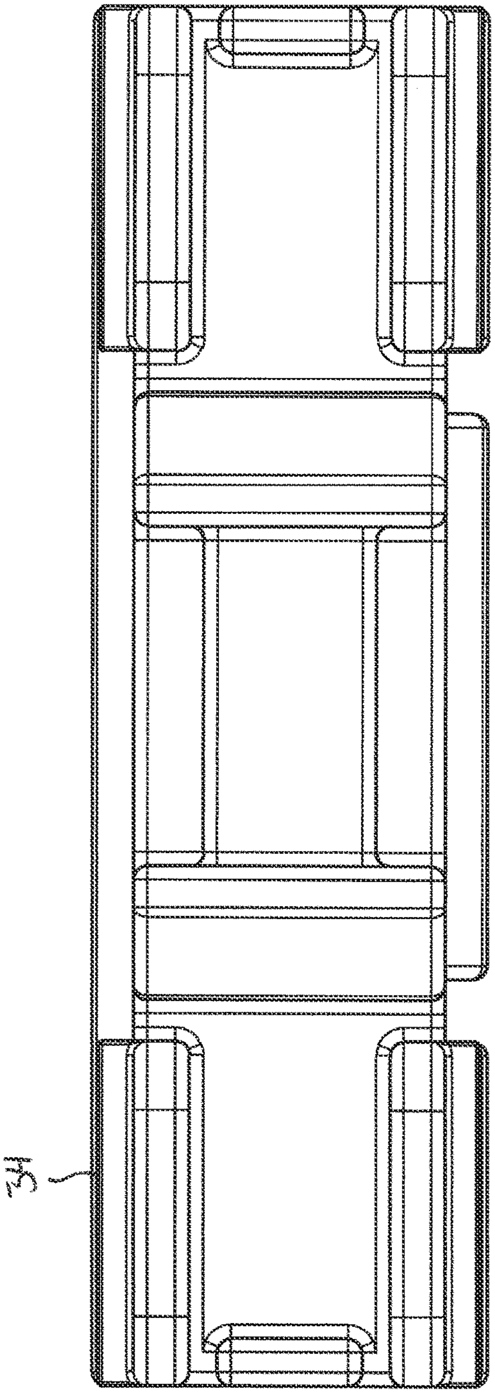
FIG. 11 is a top plan view of the tension clip.
Figure 12:
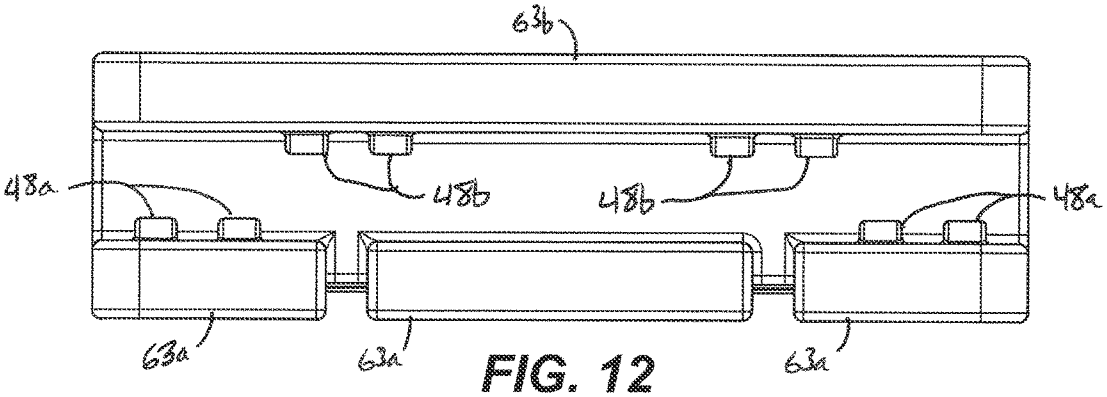
FIG. 12 is a bottom plan view of another tension clip having staggered fabric-engaging projections.
Figure 13:
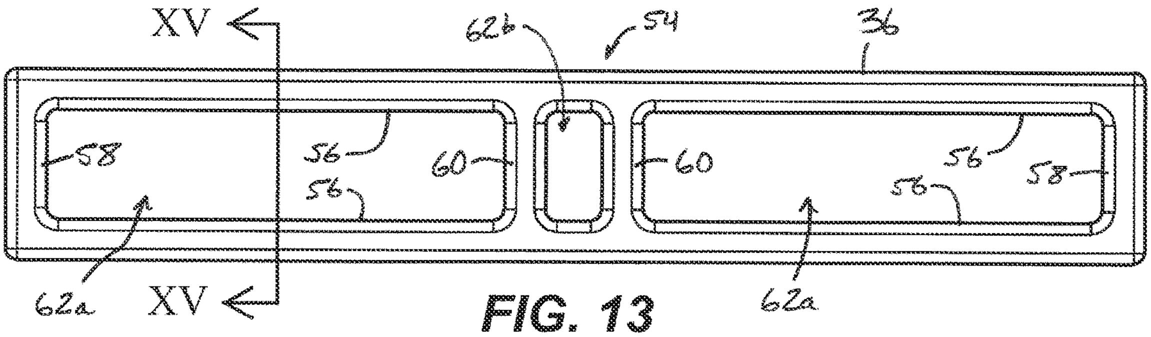
FIG. 13 is a front elevation view of the mandrel of FIG. 7.
Figure 14:
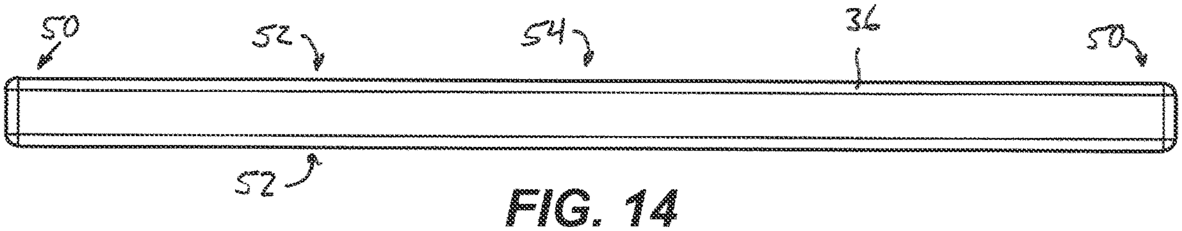
FIG. 14 is a top plan view of the mandrel of FIG. 7.

Each leg 42*a*, 42*b* has two pair of fabric-engaging projections 48*a*, 48*b* that extend inwardly into the fabric-receiving channel 38 along respective inner surfaces of the legs, as shown in FIGS. 2, 5, and 7-10. While fabric-engaging projections 48*a*, 48*b* may be located directly across from one another as shown in FIG. 10, they may also be offset from one another as shown in FIG. 12. Fabric-receiving channel 38 is sized and shaped to receive mandrel 36, with perimeter edge portion 22*a* of fabric sheet 22 wrapped around the mandrel 36 as shown in FIG. 2. Mandrel 36 is an elongate bar that is symmetrical end-to-end and side-to-side, allowing it to function identically whether inserted into channel 38 in either of two 180 degree orientations about a longitudinal mandrel axis $A_{LM}$ or in either of two 180 degree orientations about a vertical mandrel axis $A_{VM}$ (FIG. 7).

Figure 15:
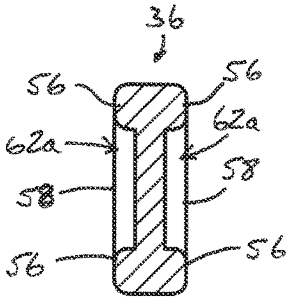
FIG. 15 is a cross-sectional view of the mandrel, taken along line XV-XV of FIG. 13.
Figure 16:
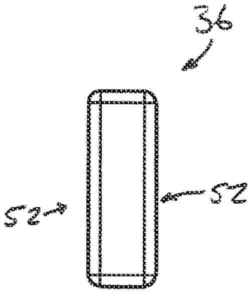
FIG. 16 is an end elevation view of the mandrel of FIG. 7.

Mandrel 36 has opposite end portions 50, opposite sides 52, and a central region 54 through which vertical mandrel axis $A_{VM}$ passes. Each opposite side 52 has a pair of longitudinal ribs 56, an outboard rib 58 extending between the longitudinal ribs 56 at each opposite end portion 50, and a pair of inboard or medial ribs 60 spaced apart on either side of vertical mandrel axis $A_{VM}$. Longitudinal ribs 56 cooperate with outboard ribs 58 and inboard ribs 60 to form two outboard recesses 62*a* and one central or inboard recess 62*b* along each side 52, such as shown in FIGS. 7 and 12. Therefore, mandrel 36 has a cross-sectional I-shape in the regions of recesses 62*a*, 62*b* such as shown in FIGS. 2 and 15, and mandrel 36 has a cross-sectional rectangular shape (generally corresponding to the end elevation of FIG. 16) in the regions of outboard ribs 58.

This arrangement of outboard and inboard ribs 58, 60 allows the mandrel 36 to be cut approximately in half, through central recess 62*b*, with each resultant half now having effectively two pair of outboard ribs because inboard ribs 60 are now proximate the cut end of the respective half mandrel. Tension clip 34 may also be cut essentially in half, along or adjacent vertical clip axis $A_{VC}$, and used as two tension clip halves or portions, each with a respective half mandrel. The use of half clips and half mandrels facilitates use with curved frame pieces 28, since the full-length tension clips 34 and mandrels 36 may be too stiff to easily achieve desired curvature radii in some sign applications. However, relief slots 61 may be formed in legs 42*a* to improve flexibility of whole tension clips 34. Because mandrels 36 have outboard ribs 58, the full mandrels 36 are secured against falling out of frame channels 30, such as could otherwise results when used in vertically-aligned frame pieces 24 and under vibrations, which may be caused by passing winds or air currents, for example. Because even half-mandrels have inboard ribs 60 that are at the cut end, the half-mandrels also resist falling out of half frame channels 30, being held in place by fabric-engaging projections 48*a*, 48*b* of the corresponding half-clip.

Referring to FIG. 2, when perimeter edge portion 22*a* of fabric sheet 22 wrapped around the mandrel 36, which is then inserted into fabric-receiving channel 38 of clip 34, fabric-engaging projections 48*a*, 48*b* press or urge respective portions of the fabric edge portion 22*a* into the outboard recesses 62*a* in the mandrel 36. Fabric-engaging projections 48*a*, 48*b* are spaced apart so as to initially resist insertion of one of the mandrel's longitudinal ribs 56, and to then permit the rib 56 to pass the projections 48*a*, 48*b* and extend further into channel 38, toward frame-engaging portion 40 due to flex of legs 42*a*, 42*b* and/or compression of fabric 22. Projections 48*a*, 48*b* therefore retain the mandrel 36 in channel 38 as the tensioning assembly 28 is inserted into frame channel 30 such that one set of teeth 44*a* or 44*b* engage the tooth-receiving surface 46. Fabric tension $T_F$ (FIG. 2) causes the teeth 44*a* or 44*b* on one side 40*a* or 40*b* to be driven into engagement with the tooth-receiving surface 46, and urges a foot 63*a*, 63*b* of the opposite-side leg 42*a* or 42*b* toward another surface 64 of the frame channel 30, opposite the tooth-receiving surface 46.

Figure 3:
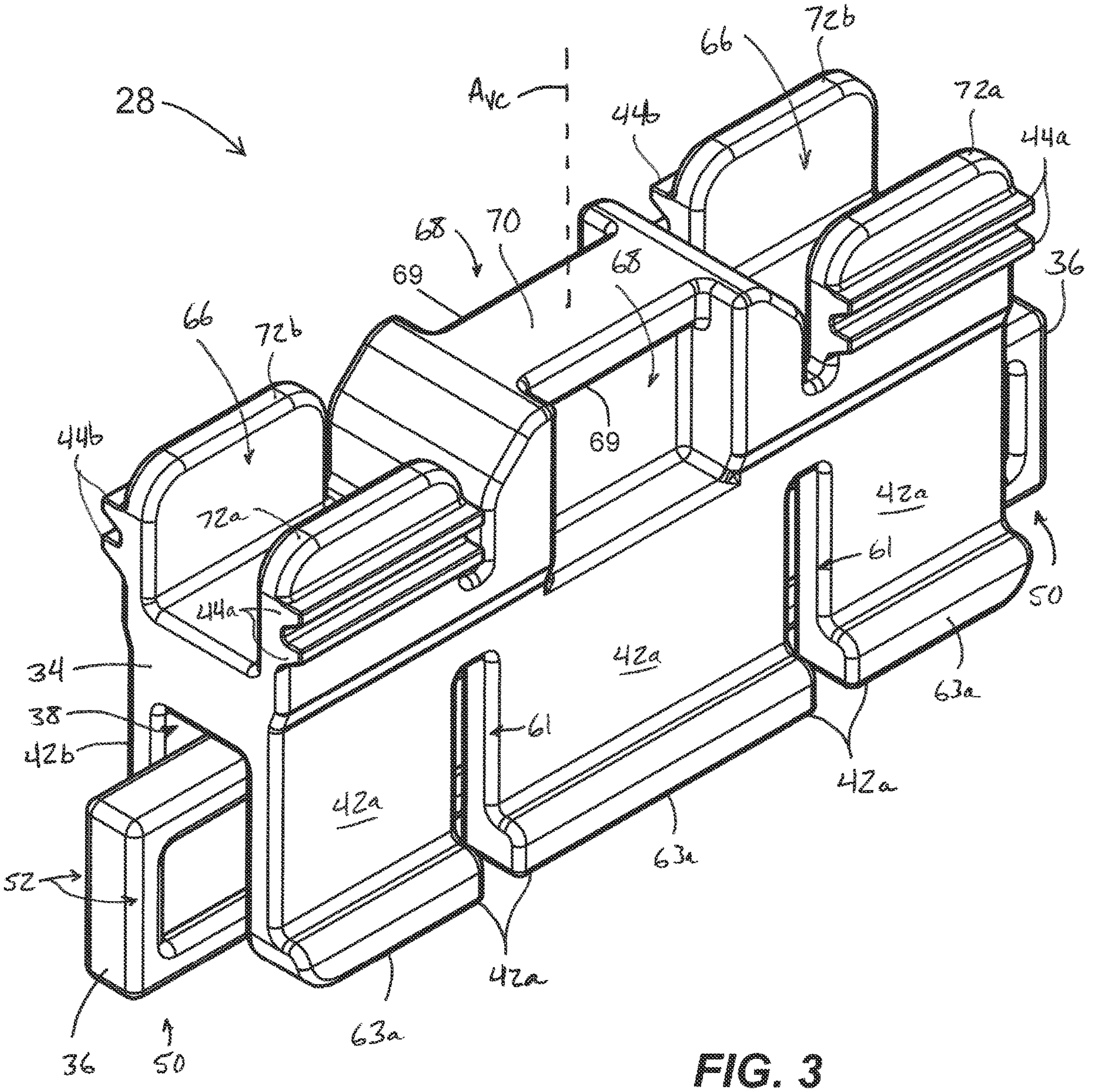
FIG. 3 is a perspective view of a tension clip and mandrel of the framing system of FIG. 1, viewed from one side.
Figure 4:
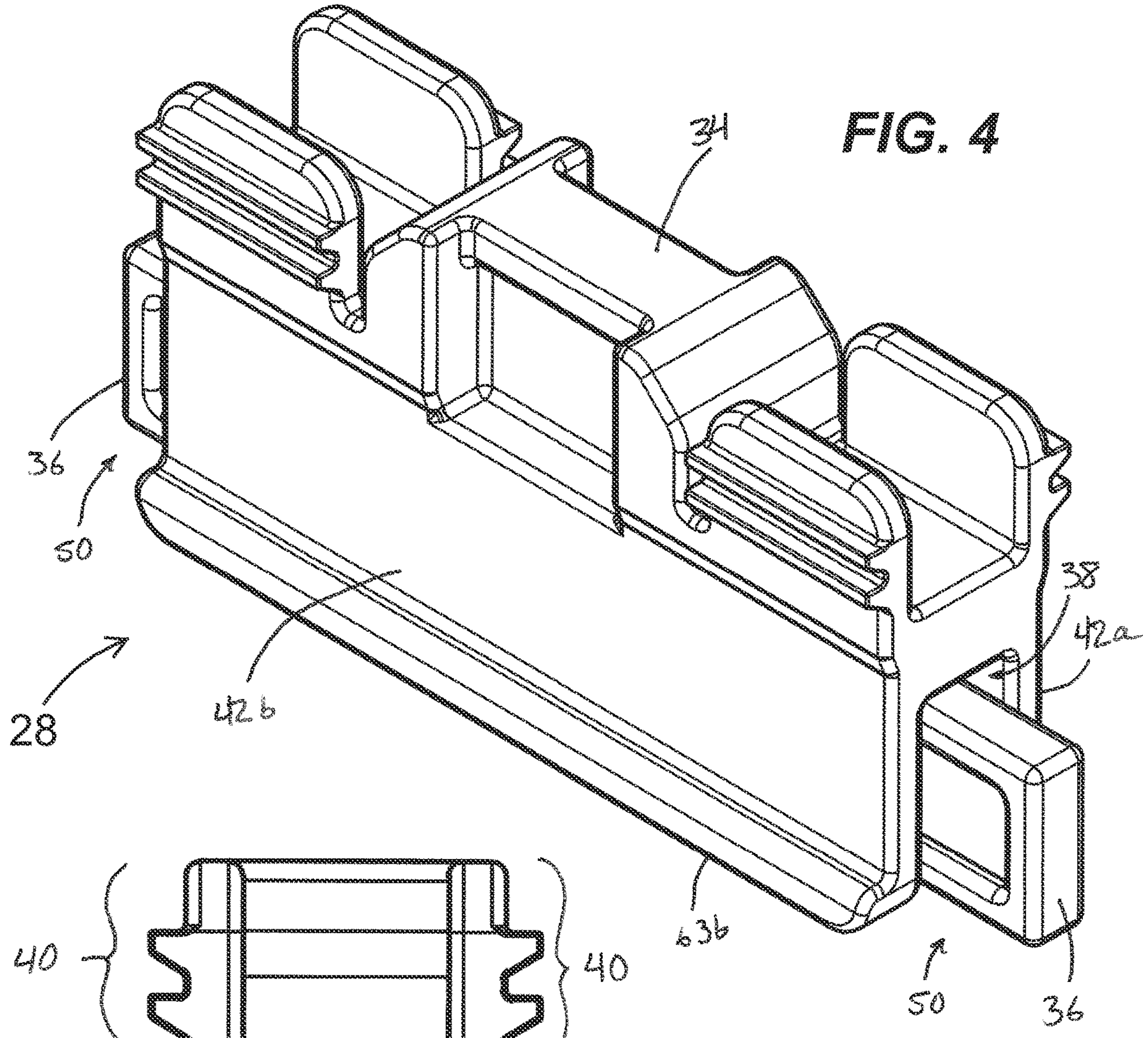
FIG. 4 is another perspective view of the tension clip and mandrel of FIG. 3, viewed from an opposite side.
Figure 5:
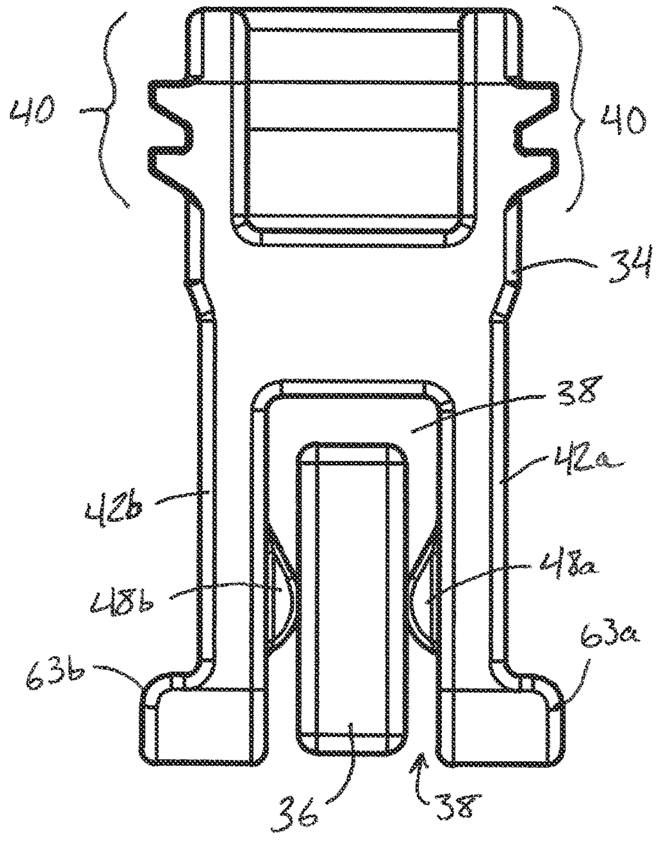
FIG. 5 is an end elevation view of the tension clip and mandrel of FIG. 3.

Tensioning assembly 28 may be driven into frame channel 30 using a tool that presses into one of two insertion channels 66 located between sets of teeth 44*a*, 44*b* at the opposite sides 40*a*, 40*b* of frame-engaging portion 40, similar to the manner described in U.S. Pat. No. 5,467,546, which is hereby incorporated herein by reference in its entirety. To facilitate removing tensioning assembly 28 from a frame piece 24, a pair of release recesses 68 are provided on either side of a central prying portion 70 through which vertical clip axis $A_{VC}$ passes. Central prying portion 70 includes an upper shelf or overhang region 69 at an upper or outer end of each recess 68. A tool may be inserted into one of the release recesses 68 and pried against prying portion 70, and optionally against a lower surface of overhang region 69, to disengage teeth 44*a* or 44*b*, such as in a similar manner as that described in the above-referenced U.S. Pat. No. 5,467,546. In the illustrated embodiment, first teeth 44*a* are on respective first projection plates 72*a* on first side 40*a* of frame-engaging portion 40, and second teeth 44*b* are on respective second projection plates 72*b* on second side 40*b* of frame-engaging portion 40, such as shown in FIG. 3.

Figure 17:
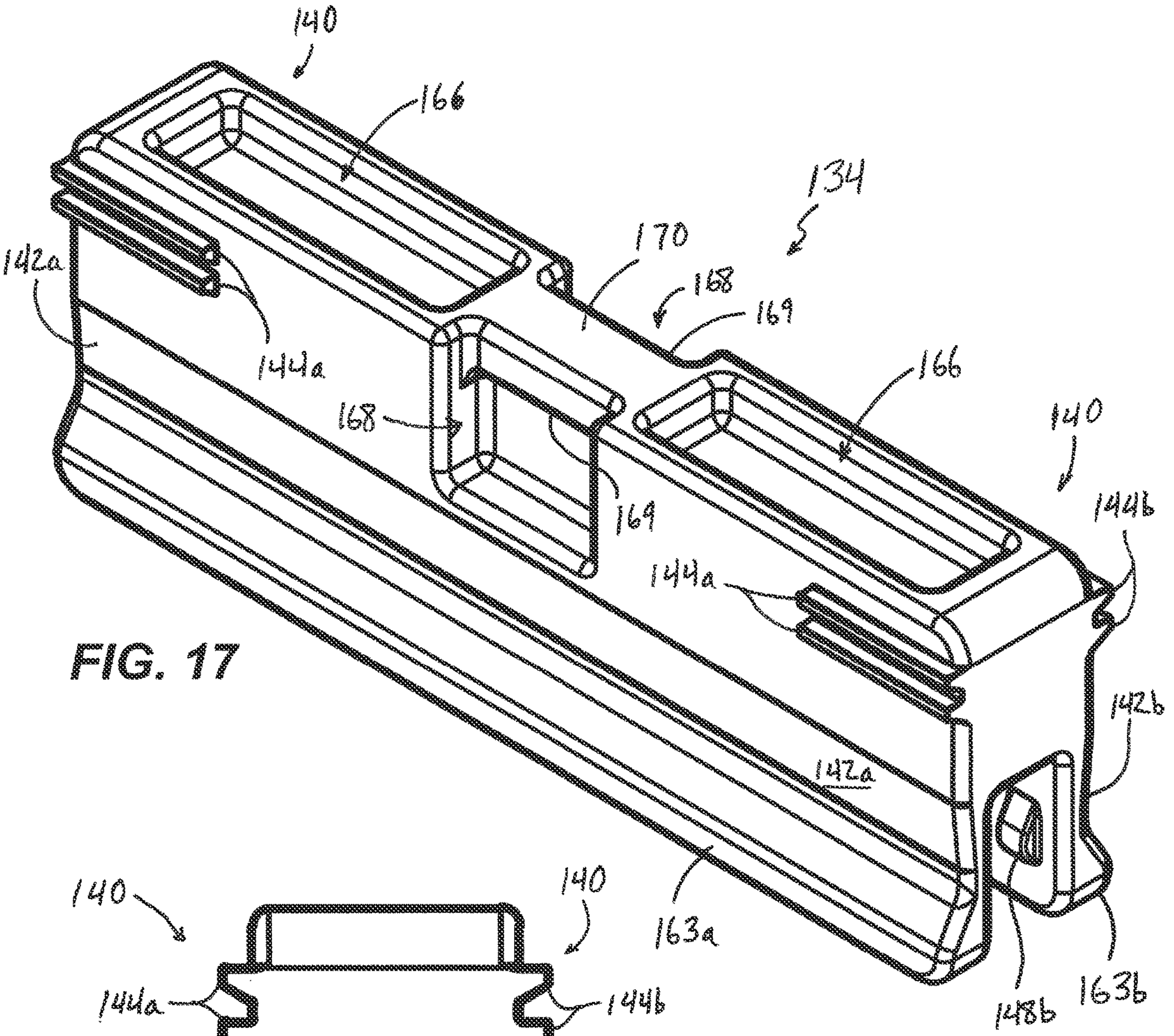
FIG. 17 is a perspective view of another tension clip in accordance with the present invention.
Figure 18:
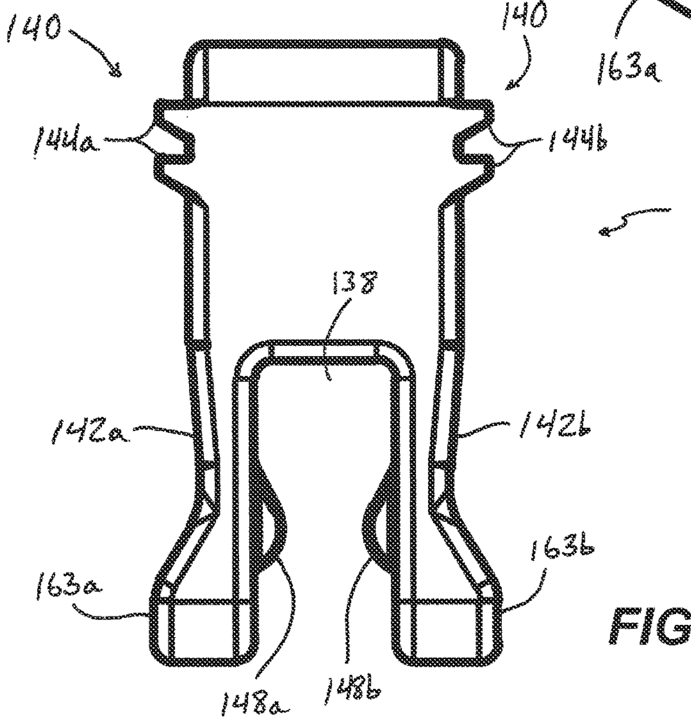
FIG. 18 is an end elevation view of the tension clip of FIG. 17.
Figure 19:
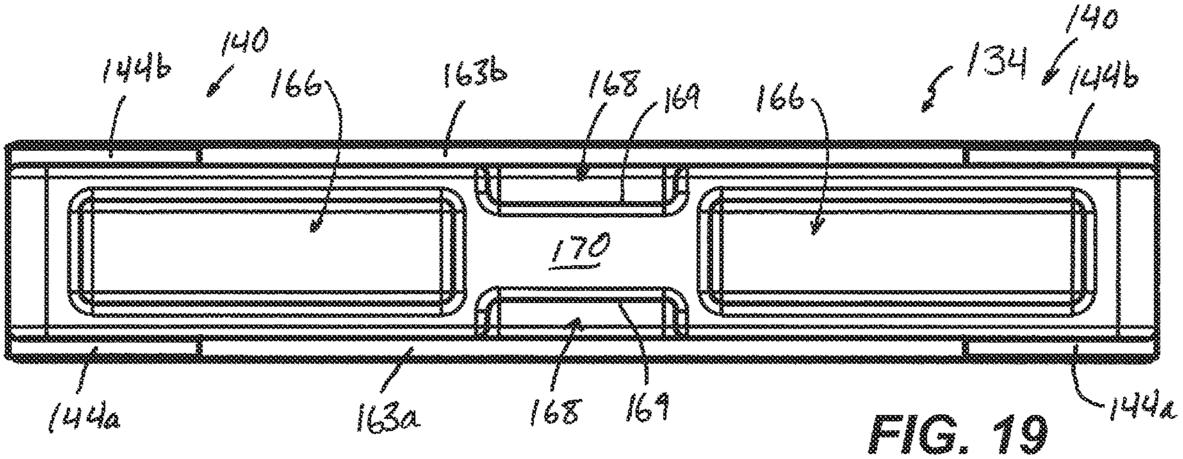
FIG. 19 is a top plan view of the tension clip of FIG. 17.
Figure 20:
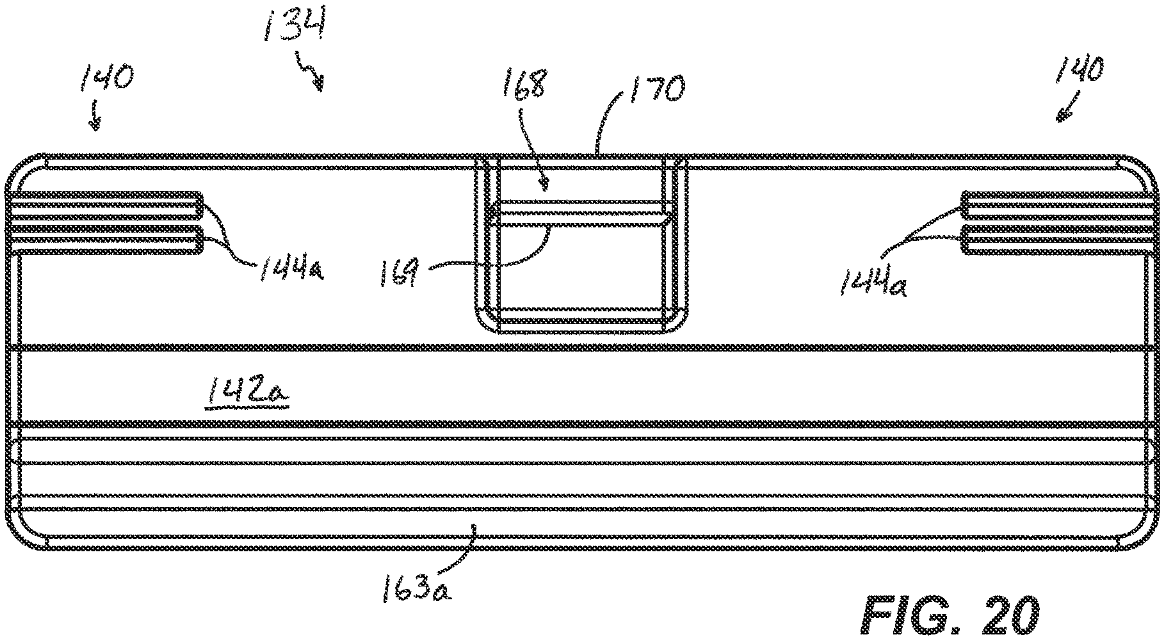
FIG. 20 is a front elevation view of the tension clip of FIG. 17.
Figure 21:
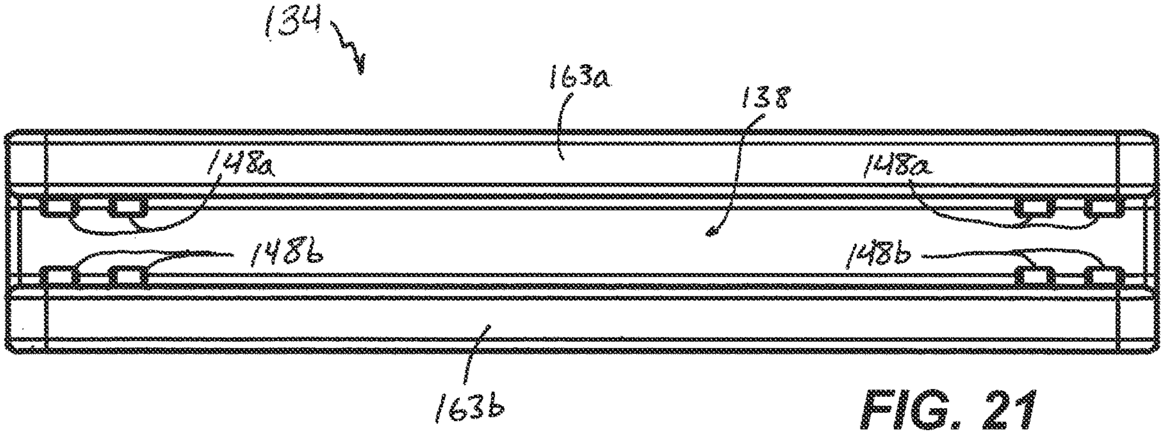
FIG. 21 is a bottom plan view of the tension clip of FIG. 17.

Other tension clips are envisioned, such as a tension clip 134 having a stronger and more durable frame-engaging portion 140 as shown in FIGS. 17-21. In the drawings, components of tension clip 134 that correspond to components of the tension clip 34 described above are given like numerals with the addition of 100, such as legs 142*a*, 142*b* that substantially correspond to legs 42*a*, 42*b* of tension clip 34. Therefore, an understanding of various corresponding features of tension clip 134 may be obtained with reference to the above descriptions, and the following discussion will be mainly limited to distinctions. Frame-engaging portion 140 of tension clip 134 includes sets of teeth 144*a*, 144*b* on opposite sides thereof, with a central prying portion 170 and a pair of release recesses 168 with an upper shelf or overhang region 169 at an upper or outer end of each recess 168, such as shown in FIGS. 17 and 19. Two insertion depressions or recesses or channels 166 are formed along the upper or outer region of tension clip 134, and serve to receive the tip of a tool when the tool is used to press tension clip 134 into the frame channel 30. The insertion recesses 166 are shallower than the insertion channels 66 described above, leaving more material in the upper or outer region of tension clip 134, and not forming lengthy projection plates 72*a*, 72*b*, thus reducing the risk of breakage as compared to tension clip 34. Insertion recesses 166 also extend along a greater proportion of the tension clip's length, providing a larger area for receiving a tool, and raised ridges surrounding the In other aspects tension clip 134 is substantially similar to tension clip 34. Tension clip 134 has legs 142*a*, 142*b* that are dimensioned similarly to those of tension clip 34, but with inward curvature (see FIG. 18) as compared to the straight-sided legs 42*a*, 42*b* of clip 34 (see FIG. 5). Legs 142*a*, 142*b* lack relief slots 61 and are therefore continuous along their lengths, and their respective feet 163*a*, 163*b* extend further along the legs. Fabric-engaging projections 148*a*, 148*b* are positioned inside fabric-receiving channel 138, similarly to the corresponding projections 48*a*, 48*b*, such as shown in FIG. 21 compared to FIG. 10. Thus, tension clip 134 can be used in substantially the same manner as tension clip 34, and is compatible for use with the same mandrels 36 as tension clip 34. Tension clip 134 may be cut down to smaller sizes in the same manner as tension clip 34, and functions in substantially the same manner as tension clip 34.

Figure 22:
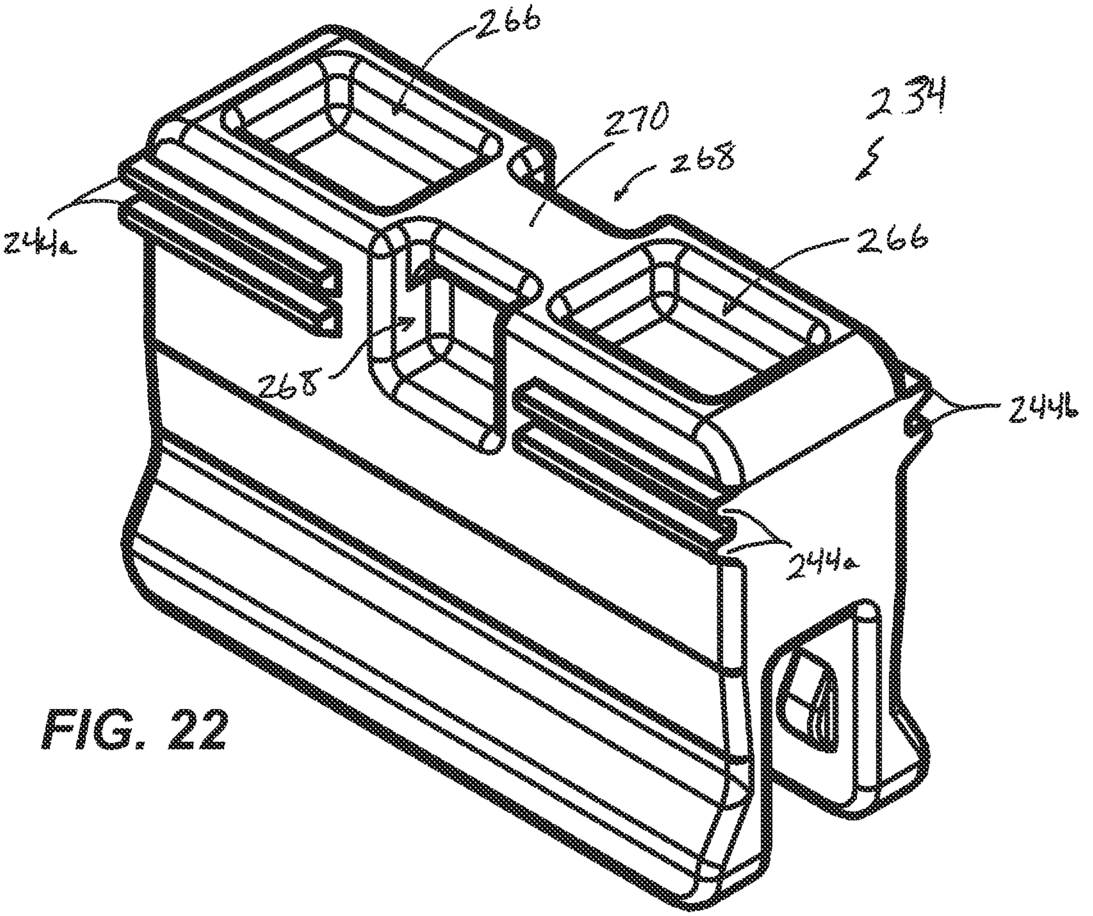
FIG. 22 is a perspective view of another tension clip in accordance with the present invention.
Figure 23:
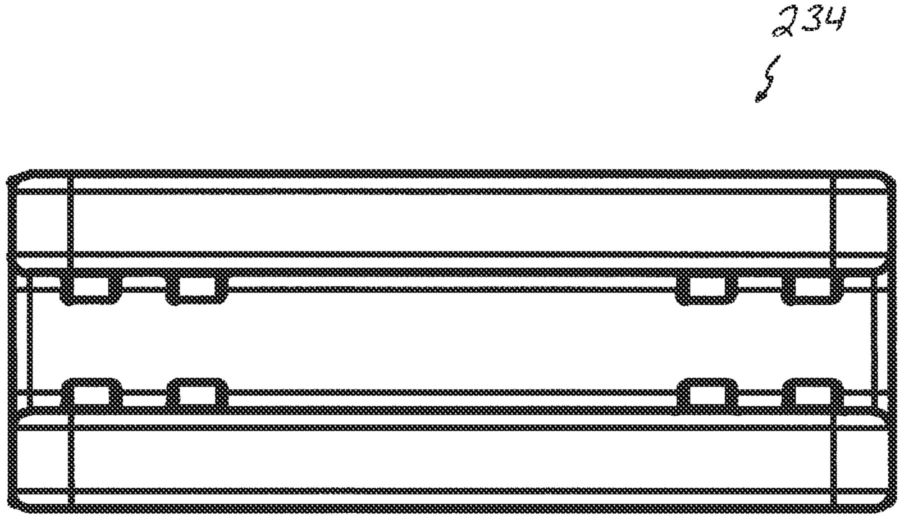
FIG. 23 is a bottom plan view of the tension clip of FIG. 22.
Figure 24:
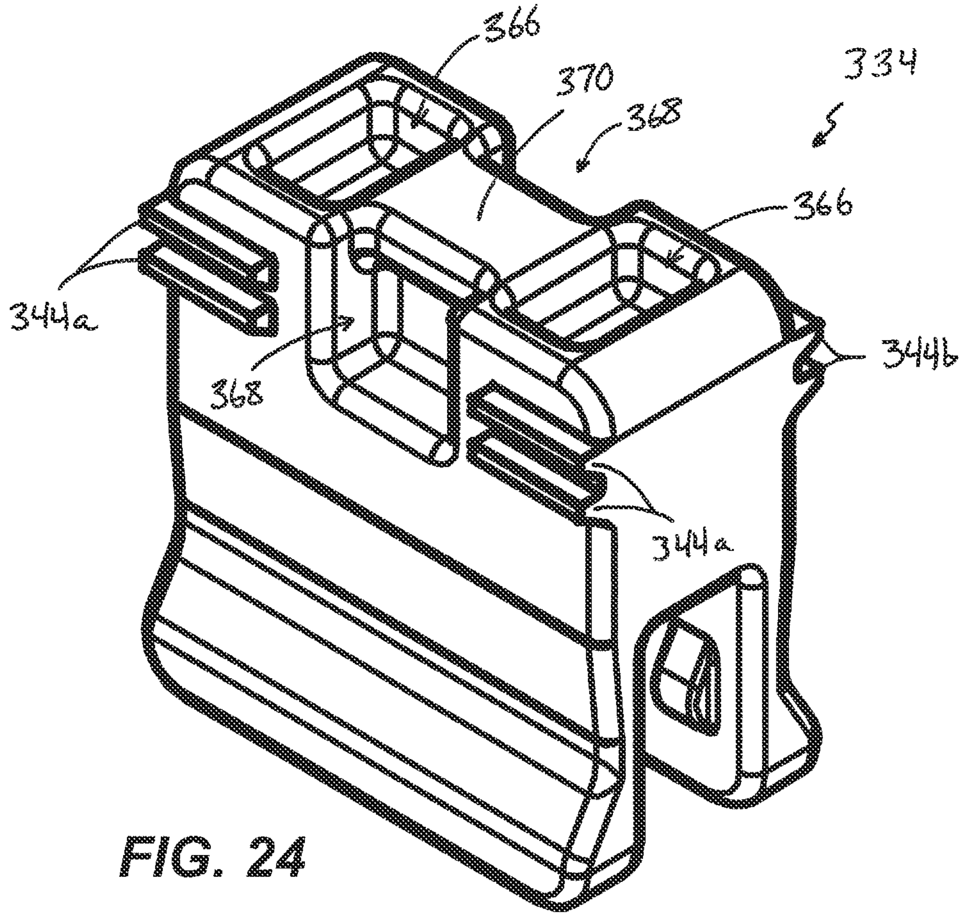
FIG. 24 is a perspective view of another tension clip in accordance with the present invention.
Figure 25:
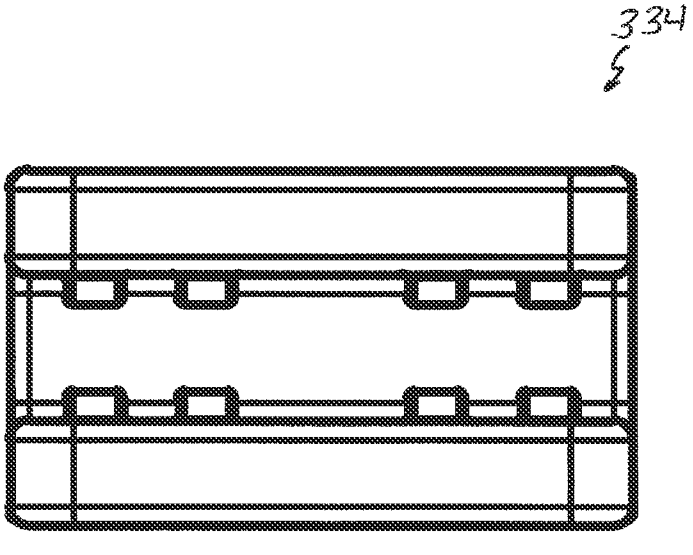
FIG. 25 is a bottom plan view of the tension clip of FIG. 24.

It is further envisioned that tension clips may be provided in different sizes and lengths according to desired applications. For example, wider tension clips may be formed in substantially the same manner as the tension clips 34, 134 described above, but with increased width to fit wider sign channels. Shorter-length tension clips may be suitable for curved regions of sign channels. For example, FIGS. 22 and 23 illustrate a medium-length tension clip 234 having sets of teeth 244*a*, 244*b* that are similar in length to teeth 144*a*, 144*b*, but with shortened dimensions primarily between teeth 244*a*, 244*b* and release recesses 268. FIGS. 24 and 25 illustrate a short-length tension clip 234 having shortened sets of teeth 344*a*, 344*b* as well as shortened dimensions between teeth 244*a*, 244*b* and release recesses 368.

It is further envisioned that tension clips may be provided in different sizes and lengths according to desired applications. For example, wider tension clips may be formed in substantially the same manner as the tension clips 34, 134 described above, but with increased width to fit wider sign channels. Shorter-length tension clips may be suitable for curved regions of sign channels. For example, FIGS. 22 and 23 illustrate a medium-length tension clip 234 having sets of teeth 244*a*, 244*b* that are similar in length to teeth 144*a*, 144*b*, but with shortened dimensions primarily between teeth 244*a*, 244*b* and release recesses 268. FIGS. 24 and 25 illustrate a short-length tension clip 234 having shortened sets of teeth 344*a*, 344*b* as well as shortened dimensions between teeth 244*a*, 244*b* and release recesses 368.

Figure 26:
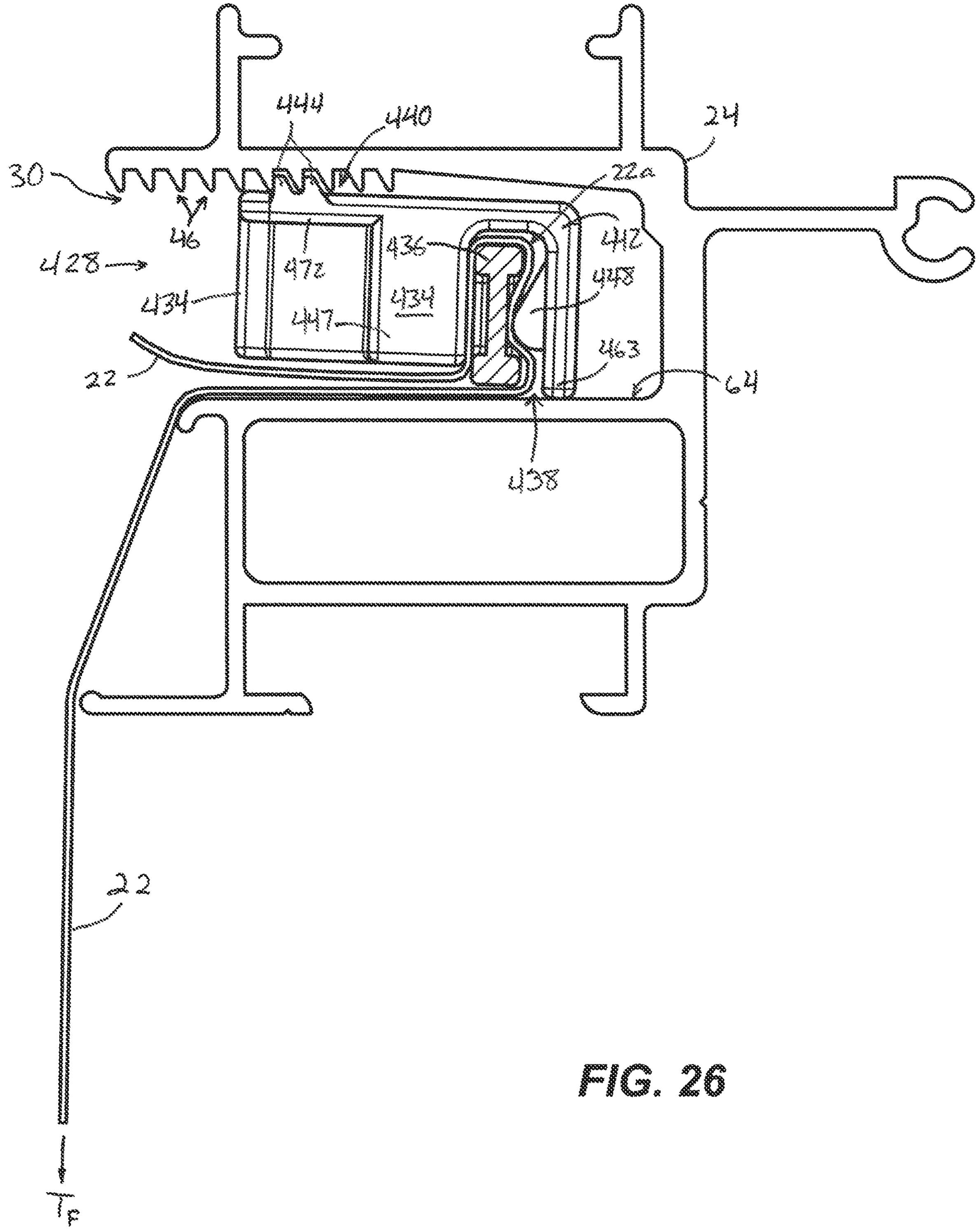
FIG. 26 is an end elevation view of a portion of another tension clip and mandrel in accordance with the present invention, shown secured to a sign frame and coupling a fabric sheet to the sign frame, and with a mandrel shown in section view to reveal hidden structure.
Figure 27:
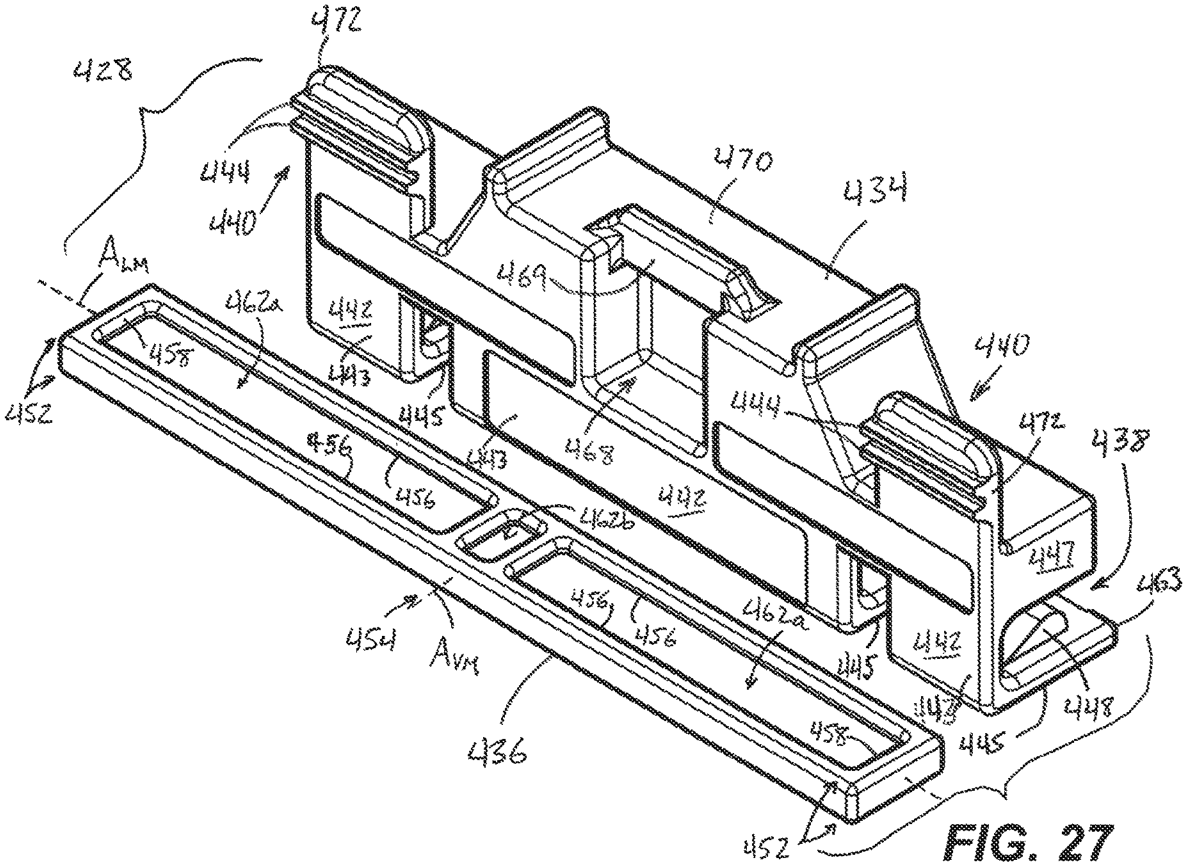
FIG. 27 is an exploded perspective view of the tension clip and mandrel of FIG. 26.
Figure 28:
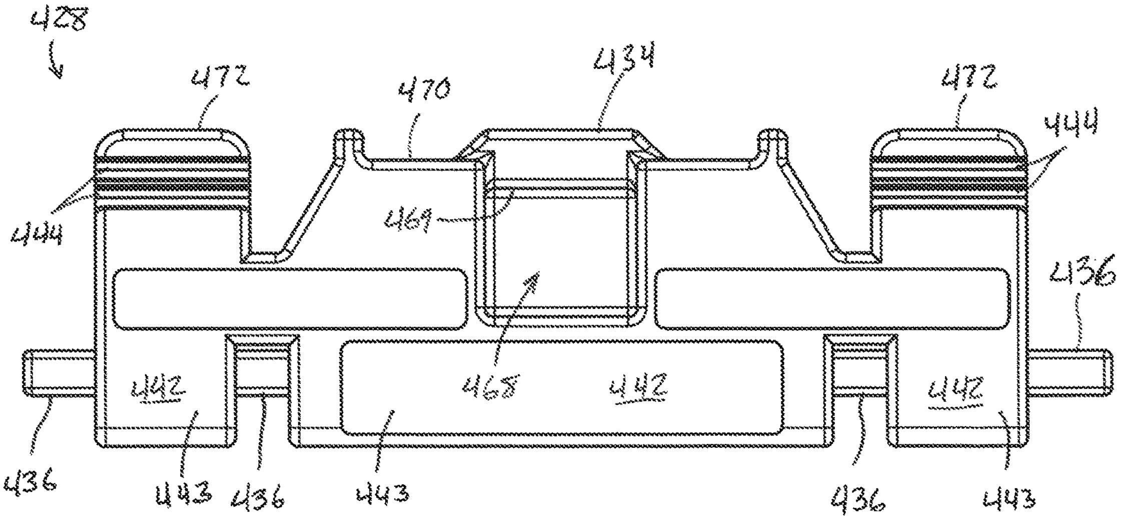
FIG. 28 is a front elevation view of the tension clip and mandrel of FIG. 26.

Tensioning assemblies having someone different shape configurations are also envisioned, such as the tensioning assembly 428 of FIGS. 26-28 that includes a tension clip 434 defining a fabric-receiving channel 438 (FIGS. 26, 27, and 29) that is accessible from a side rather than from the bottom. In FIGS. 26-33, components of tensioning assembly 428 that correspond to components of the tensioning assembly 28 described above are given like numerals with the addition of 400 (letter suffixes omitted where singular structures of tension clip 434 correspond to opposing pairs of structures of tension clip 34), such that an understanding of various corresponding features of tensioning assembly 428 may be obtained with reference to the above descriptions, and the following discussion will be mainly limited to distinctions.

A mandrel 436 that is much like mandrel 36 described above, is provided for insertion into the fabric-receiving channel 438 of the tension clip 434, with a section of fabric sheet 22 wrapped around the mandrel 436 (FIG. 26) prior to insertion. Aside from dimensional variations, mandrel 436 is substantially the same as mandrel 36 and can be used and modified in substantially the same ways, described above.

Figure 29:
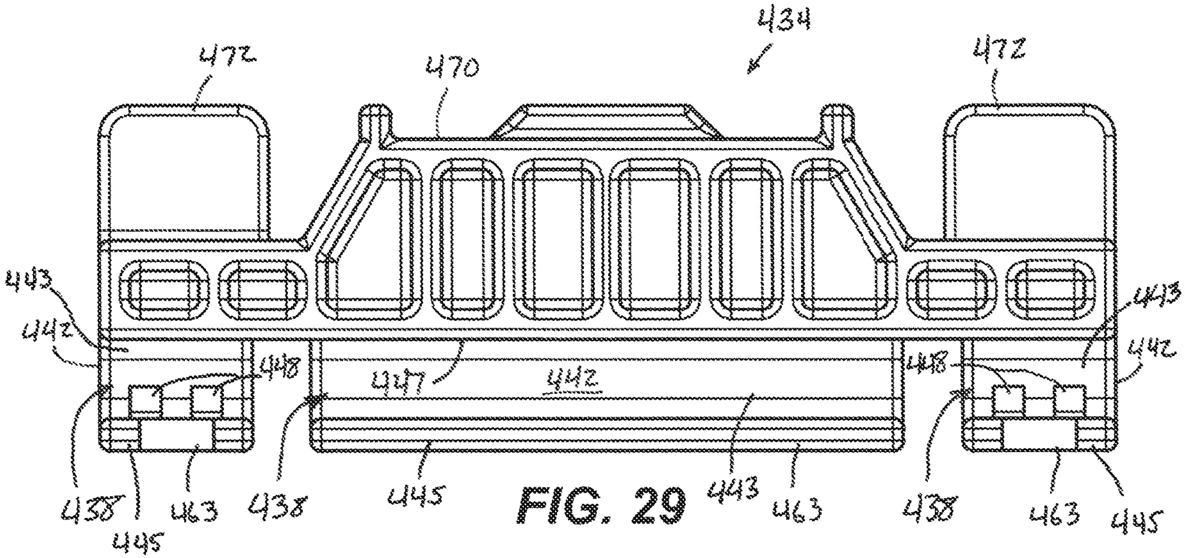
FIG. 29 is a rear elevation view of the tension clip of FIG. 27.
Figure 30:
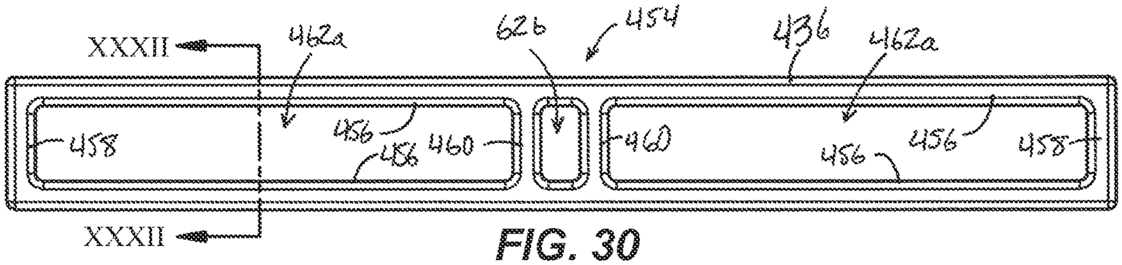
FIG. 30 is a top plan view of the mandrel of FIG. 27.
Figure 31:
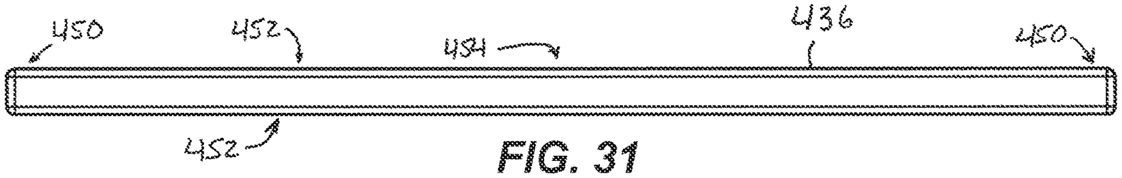
FIG. 31 is a side elevation view of the mandrel of FIG. 27.
Figure 32:
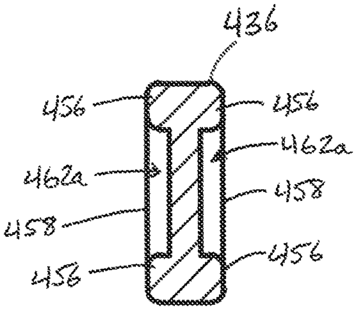
FIG. 32 is a cross-sectional view of the mandrel of FIG. 27, taken along line XXXII-XXXII of FIG. 30.
Figure 33:
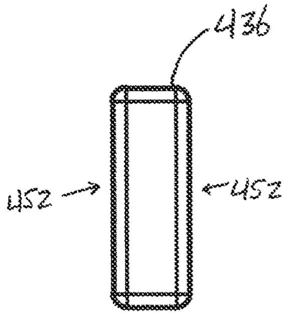
FIG. 33 is an end elevation view of the mandrel of FIG. 27.

Tension clip 434 includes a single set of legs 442 arranged in line with one another, which are generally L-shaped including a downward-extending portion 443 and a lateral portion 445. The lateral portion 445 is spaced below a central body portion 447 from which the downward-extending portion 443 extends, to define a fabric-receiving channel 438. The lateral portion 445 terminates at a foot 463 that can contact a surface 64 of the frame channel 30 of the frame piece 24 when in use, as shown in FIG. 26. A set of fabric-engaging projections 448 extend upwardly into channel 438 from the lateral portions 445 of the end legs 442, such as shown in FIGS. 26, 27, and 29. Each pair of projections 448 engage a respective outboard recess 462*a* of the mandrel 436.

A single set of projection plates 472 extend upwardly along one side of frame-engaging portion 440, each having a pair of teeth 444 for engaging the corresponding tooth-receiving surface 46 of frame piece 24. Along the same side of frame-engaging portion 440 as projection plates 472 is a release slot or recess 468 with an upper shelf or overhang region 469 at an upper or outer end of recess 468. A tool such as a screwdriver may be inserted into the release recess 468 and pried against a prying portion 470 to disengage teeth 444 from tooth-receiving surface 46.

It will be appreciated that tension clip 434 and mandrel 436 may be used in substantially the same way as the other clips 34, 134, 234, 334 and mandrel 36 described above, but without the double-sided features that allow for use of the other clips in two different orientations. Mandrel 436 is inserted into the perimeter edge portion 22*a* of fabric sheet 22, and then into the fabric-receiving channel 438. The mandrel 436 with fabric sheet edge portion 22*a* are pressed in until fabric-engaging projections 448 engage the outboard recess 462*a* of the mandrel 436, thus retaining the mandrel and edge portion 22*a* in the channel 438 until a sufficient removal force is applied. The tension clip 434 is oriented with its projection plates 472 and corresponding teeth 444 positioned outboard as shown in FIG. 26, and then inserted so that teeth 444 engage tooth-receiving surface 46 and sufficient fabric tension $T_F$ is achieved. In the case of tension clip 434, the foot 463 may directly contact surface 64 of the frame channel 30, whereas the earlier-described tension clips (in use) typically have two layers of fabric 22 held or pinched between foot 63 and surface 64.

Accordingly, the framing system of the present invention utilizes tension clips and mandrels that are readily installed or removed from a sign frame for tensioning a fabric sign at the frame. The tension clips and mandrels may be formed to different sizes for different applications, such as curved frames, and may also be cut into pieces having shorter lengths, with the pieces remaining functional in substantially the same manner as the full-length components. The tension clips and mandrels may be bi-directional, such that they can be installed along the fabric in either of two directions without regard for which direction the display side of the fabric is facing.

Changes and modifications in the specifically described embodiments may be carried out without departing from the principles of the present invention, which is intended to be limited only by the scope of the appended claims, as interpreted according to the principles of patent law including the doctrine of equivalents.

The invention claimed is:

1. A framing system for fabric signs, said framing system comprising:

a tension clip having a two-sided frame-engaging portion and a pair of legs extending away from said frame-engaging portion, said legs defining a fabric-receiving channel that extends longitudinally along said tension clip;

said two-sided frame-engaging portion comprising a first tooth on a first side and a second tooth on a second side opposite said first side, wherein said first tooth is configured to engage a tooth-receiving surface of a frame channel when said tension clip is in a first orientation, and wherein said second tooth is configured to engage the tooth-receiving surface when said tension clip is in a second orientation rotated 180 degrees from the first orientation;

a fabric-engaging projection extending inwardly into said fabric-receiving channel along each of said legs;

a mandrel configured for insertion into said fabric-receiving channel with a fabric edge portion wrapped around said mandrel, said mandrel having opposite sides and opposite end portions;

said mandrel comprising an outboard rib at each of said opposite end portions along each of said opposite sides, said mandrel defining a recess along each of said opposite sides between said outboard ribs;

wherein said fabric-engaging projections align with respective ones of said recesses and are configured to urge respective portions of the fabric edge portion into said recess; and wherein tension in a fabric of the fabric sign urges one of said teeth of said frame-engaging portion into engagement with the tooth-receiving surface of the frame channel, and urges one of said legs toward another surface of the frame channel opposite the tooth-receiving surface.

2. The framing system of claim 1, wherein said mandrel has a cross-sectional I-shape at said recesses.

3. The framing system of claim 1, wherein said mandrel is configured for insertion and use in said fabric-receiving channel in either of a first orientation or a second orientation rotated 180 degrees from the first orientation.

4. The framing system of claim 1, further comprising a pair of spaced-apart inboard ribs at each of said opposite sides of said mandrel, each of said spaced-apart inboard ribs spaced inboard of said outboard ribs and extending across said recess to subdivide said recess into recess portions, wherein at least two of said fabric-engaging projections extend inwardly into said fabric-receiving channel in spaced arrangement along each of said legs, and wherein each of said fabric-engaging projections is aligned with a respective one of said recess portions when said mandrel is inserted into said fabric-receiving channel.

5. The framing system of claim 4, wherein said tension clip is configured to be cut between said fabric-engaging projections to form two tension clip pieces, and said mandrel is configured to be cut between said inboard ribs to form two mandrel pieces, wherein each of said mandrel pieces is usable with a respective one of said tension clip pieces in the same manner that said mandrel is usable with said tension clip.

6. The framing system of claim 1, wherein said two-sided frame-engaging portion comprises a pair of projection plates at each of said first and second sides, and wherein said first and second tooth extends laterally outwardly from respective ones of said projection plates.

7. The framing system of claim 6, wherein said first tooth and said second tooth each comprise a pair of teeth at each of said projection plates.

8. The framing system of claim 1, wherein each of said legs comprises a respective foot extending laterally outwardly away from said fabric-receiving channel.

9. A framing system for fabric signs, said framing system comprising:

a tension clip defining a longitudinal recess, and comprising:

a retaining element; and a frame engaging portion; and a mandrel having a longitudinal length defined between first and second opposite ends, and a lateral width, wherein the longitudinal length is at least double the lateral width, said mandrel comprising:

a first outboard rib at the first end of said mandrel;

a second outboard rib at the second end of said mandrel; and a first lateral depression disposed between said first and second outboard ribs;

wherein said framing system can be adjusted into a securing configuration in which said mandrel is at least partially disposed within said longitudinal recess and said retaining element is engaged with said first lateral depression to couple said mandrel to said tension clip;

wherein said first and second outboard ribs are configured to substantially terminate longitudinal movement of said mandrel while said framing system is in said securing configuration;

wherein said framing system secures a flexible panel within said longitudinal recess while said framing system is in said securing configuration; and wherein said frame engaging portion is configured to selectively couple said tension clip to a frame.

10. The framing system of claim 9, wherein said mandrel further defines a second lateral depression and a first medial rib, said first lateral depression disposed between said first outboard rib and said first medial rib, and said second lateral depression disposed between said second outboard rib and said first medial rib.

11. The framing system of claim 10, wherein said tension clip further comprises an internal anterior face and an internal posterior face located on opposing sides of said longitudinal recess, and wherein said retaining element comprises a pair of anterior projections disposed on said internal anterior face, and a pair of posterior projections disposed on said internal posterior face.

12. The framing system of claim 11, wherein said anterior projections are staggered relative to said posterior projections.

13. The framing system of claim 11, wherein said framing system is configured to secure the flexible panel between said mandrel and said anterior and posterior projections while said framing system is in said securing configuration.

14. The framing system of claim 13, wherein said tension clip further comprises an external anterior face and an external posterior face, wherein said external anterior face defines a pair of slots, and wherein said slots are configured to enable said external anterior face to flex.

15. The framing system of claim 11, wherein said frame engaging portion comprises coupling teeth located at opposite ends of said tension clip, said coupling teeth configured to engage with coupling features on the frame to couple said tension clip to said frame.

16. The framing system of claim 15, wherein said tension clip further comprises a release slot adapted to receive a pry tool that is used to decouple said tension clip from the frame.

17. The framing system of claim 16, wherein said tension clip further comprises a pair of tensioning slots disposed proximate respective ones of said coupling teeth, said tensioning slots configured to receive a tensioning tool that is used to adjust a tension of the flexible panel by moving said tension clip relative to the frame while said framing system is in the securing configuration.

18. The framing system of claim 10, wherein said mandrel further defines a medial depression and a second medial rib, said medial depression disposed between said first and second medial ribs, said first lateral depression disposed between said first outboard rib and said first medial rib, and said second lateral depression disposed between said second outboard rib and said second medial rib.

19. A framing system for fabric signs, said framing system comprising:

a tension clip having a frame-engaging portion and a leg extending away from said frame-engaging portion, said leg defining a portion of a fabric-receiving channel that extends longitudinally along said tension clip;

said frame-engaging portion comprising a tooth configured to engage a tooth-receiving surface of a frame channel;

a pair of fabric-engaging projections extending inwardly into said fabric-receiving channel;

a mandrel configured for insertion into said fabric-receiving channel with a fabric edge portion wrapped around said mandrel, said mandrel having opposite longitudinal sides along a longitudinal length thereof and opposite end portions;

said mandrel comprising an outboard rib at each of said opposite end portions and a pair of spaced-apart medial ribs arranged parallel to and spaced inboard of said outboard ribs, said mandrel defining an outboard recess between each of said outboard ribs and a respective one of said medial ribs, and said mandrel defining a medial recess between said medial ribs;

wherein said fabric-engaging projections align with respective ones of said outboard recesses and are configured to urge respective portions of the fabric edge portion into said outboard recesses; and wherein tension in a fabric of the fabric sign urges said tooth of said frame-engaging portion into engagement with the tooth-receiving surface of the frame channel, and urges said leg toward another surface of the frame channel opposite the tooth-receiving surface.

20. The framing system of claim 19, wherein said tension clip comprises a pair of said legs spaced apart from one another to define respective portions of said fabric-receiving channel.

21. The framing system of claim 20, wherein said tension clip comprises a second tooth at said frame-engaging portion and positioned opposite said tooth, wherein said tooth and said second tooth extend in opposite directions, wherein said tooth is configured to engage the tooth-receiving surface of the frame channel when said tension clip is in a first orientation, and wherein said second tooth is configured to engage the tooth-receiving surface when said tension clip is in a second orientation rotated 180 degrees from the first orientation.

22. The framing system of claim 19, wherein said tension clip is configured to be cut between said fabric-engaging projections to form two tension clip pieces, and said mandrel is configured to be cut between said medial ribs to form two mandrel pieces, wherein each of said mandrel pieces is usable with a respective one of said tension clip pieces in the same manner that said mandrel is usable with said tension clip.

23. The framing system of claim 19, wherein said mandrel has a cross-sectional I-shape at each of said recesses, and wherein said mandrel has a cross-sectional rectangular shape at said outboard ribs and at said medial ribs.

* * * * *